Figures 19, 20:
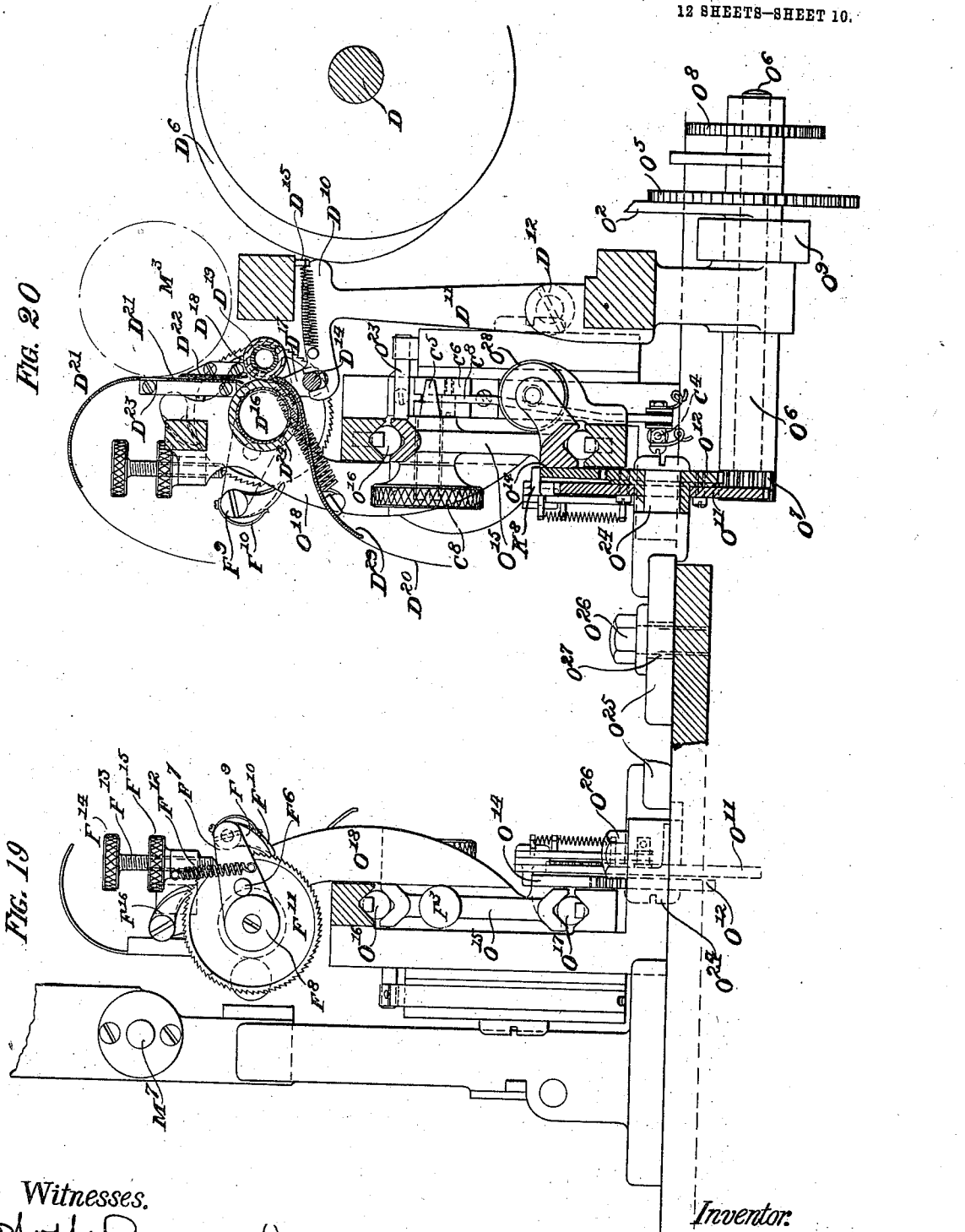

W. S. TIMMIS.
MACHINE FOR PRODUCING JUSTIFIED LINES.
APPLICATION FILED MAR. 10, 1902.
996,300.
Patented June 27, 1911.
12 SHEETS—SHEET 1.
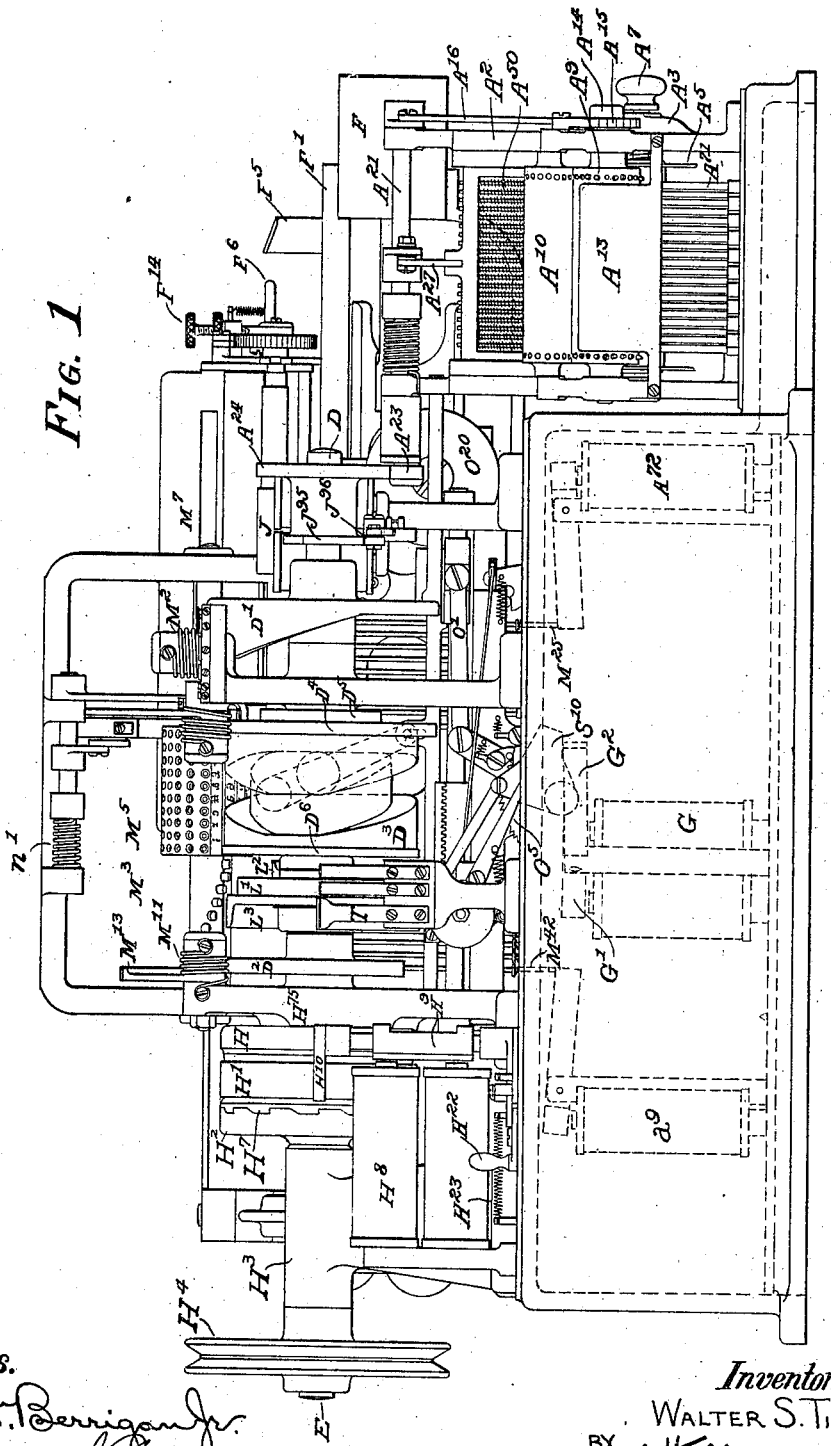
Witnesses.
Inventor:
Walter S. Timmis,
BY
Attorneys.

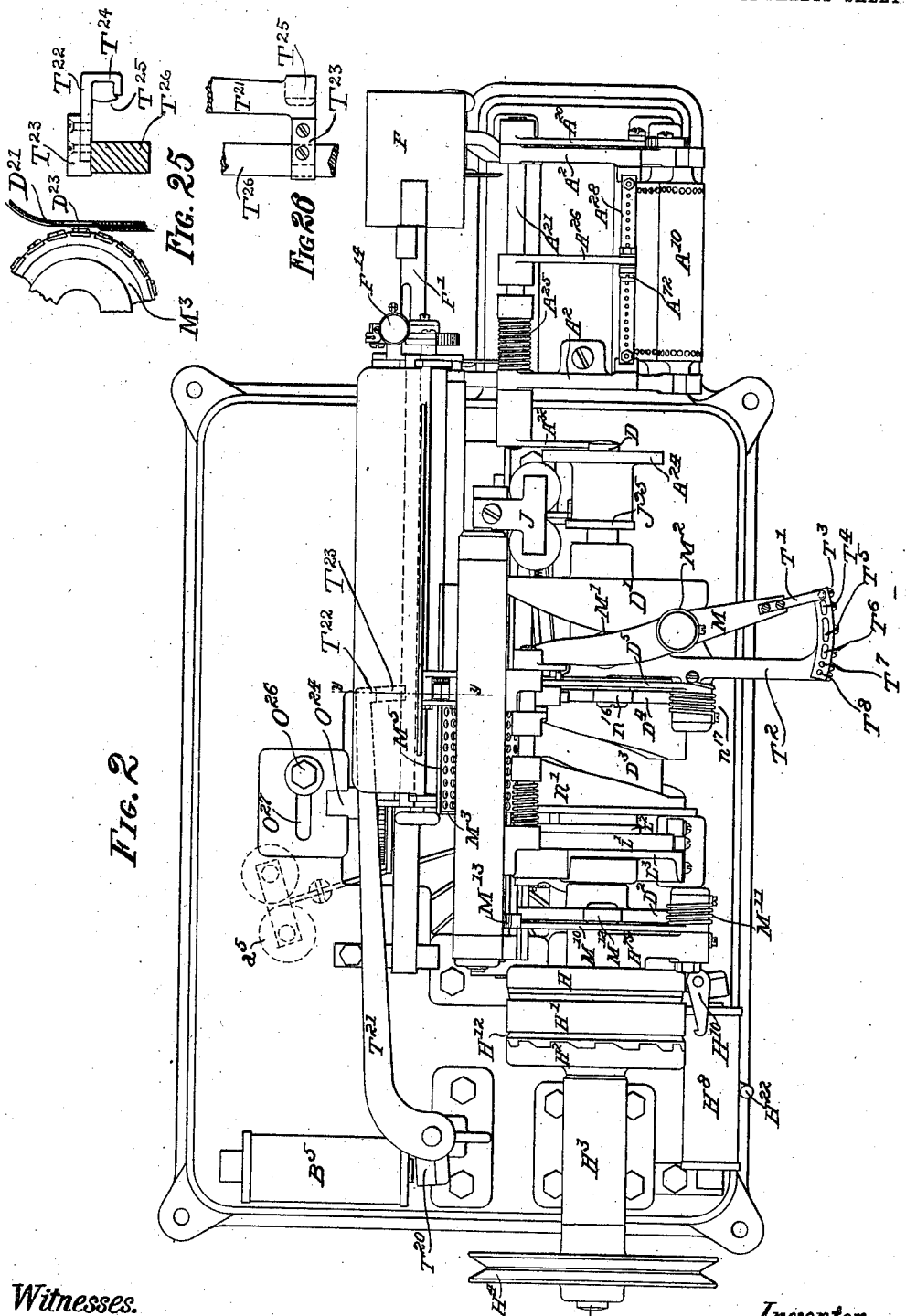

W. S. TIMMIS.
MACHINE FOR PRODUCING JUSTIFIED LINES.
APPLICATION FILED MAR. 10, 1902.
996,300.
Patented June 27, 1911.
12 SHEETS—SHEET 3.
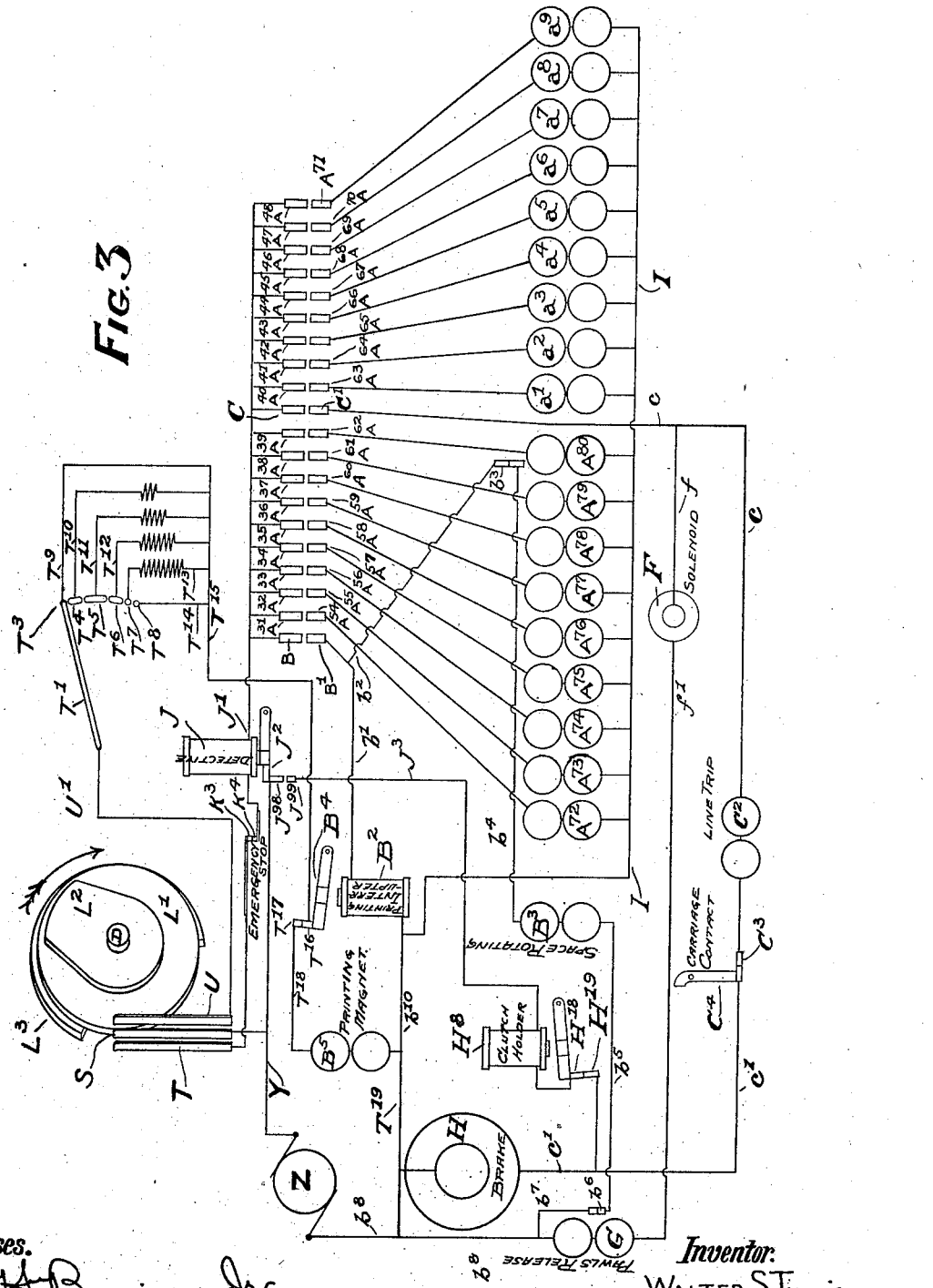
Witnesses.
Inventor:
Walter S. Timmis
BY
ATTORNEYS.

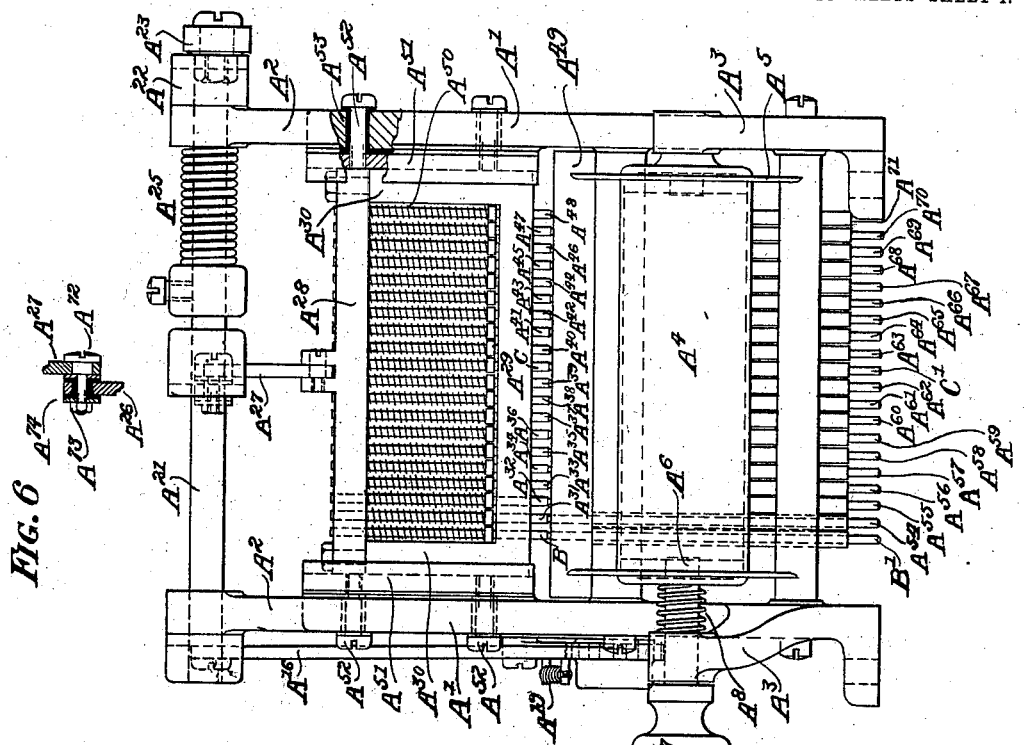
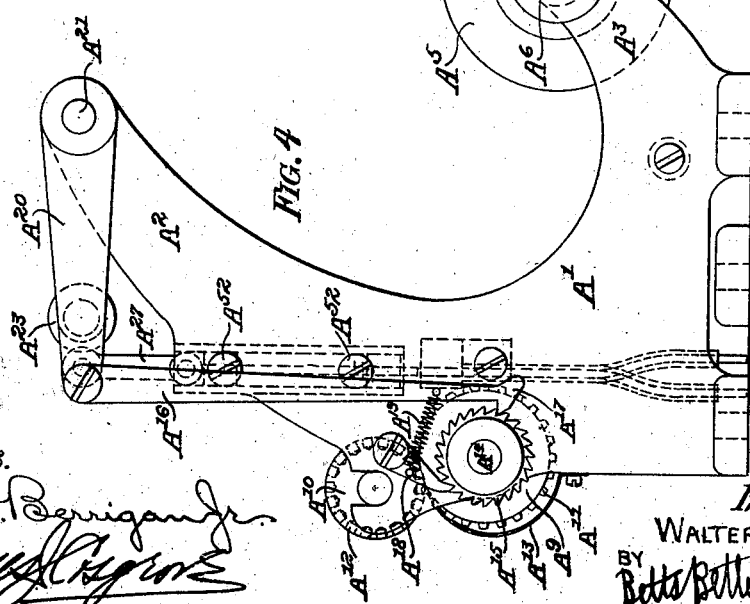

W. S. TIMMIS.
MACHINE FOR PRODUCING JUSTIFIED LINES.
APPLICATION FILED MAR. 10, 1902.
996,300.
Patented June 27, 1911.
12 SHEETS—SHEET 5.
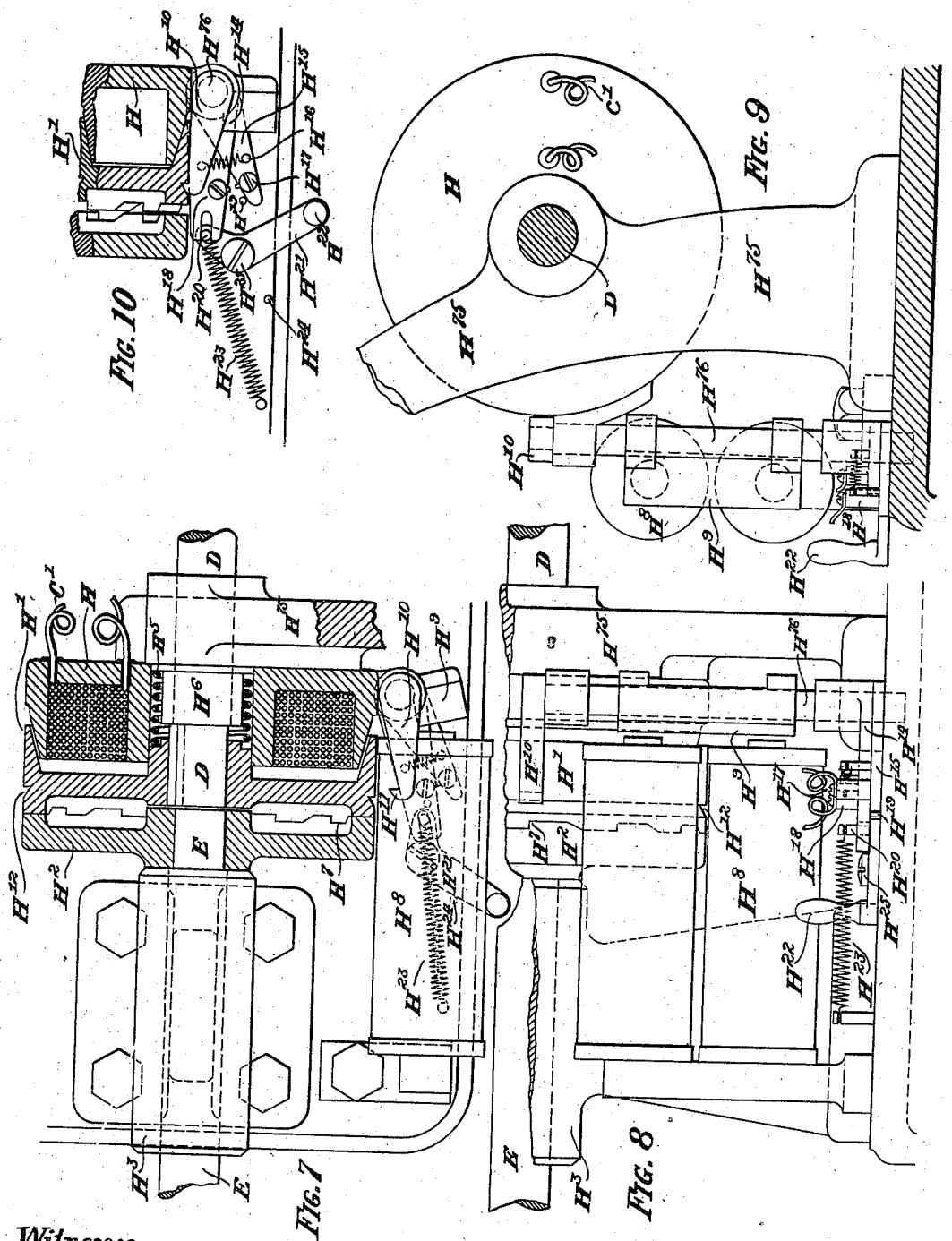
Witnesses
Inventor:
WALTER S. TIMMIS,
BY
ATTORNEYS W. S. TIMMIS.
MACHINE FOR PRODUCING JUSTIFIED LINES.
APPLICATION FILED MAR. 10, 1902.
996,300.
Patented June 27, 1911.
12 SHEETS—SHEET 6.
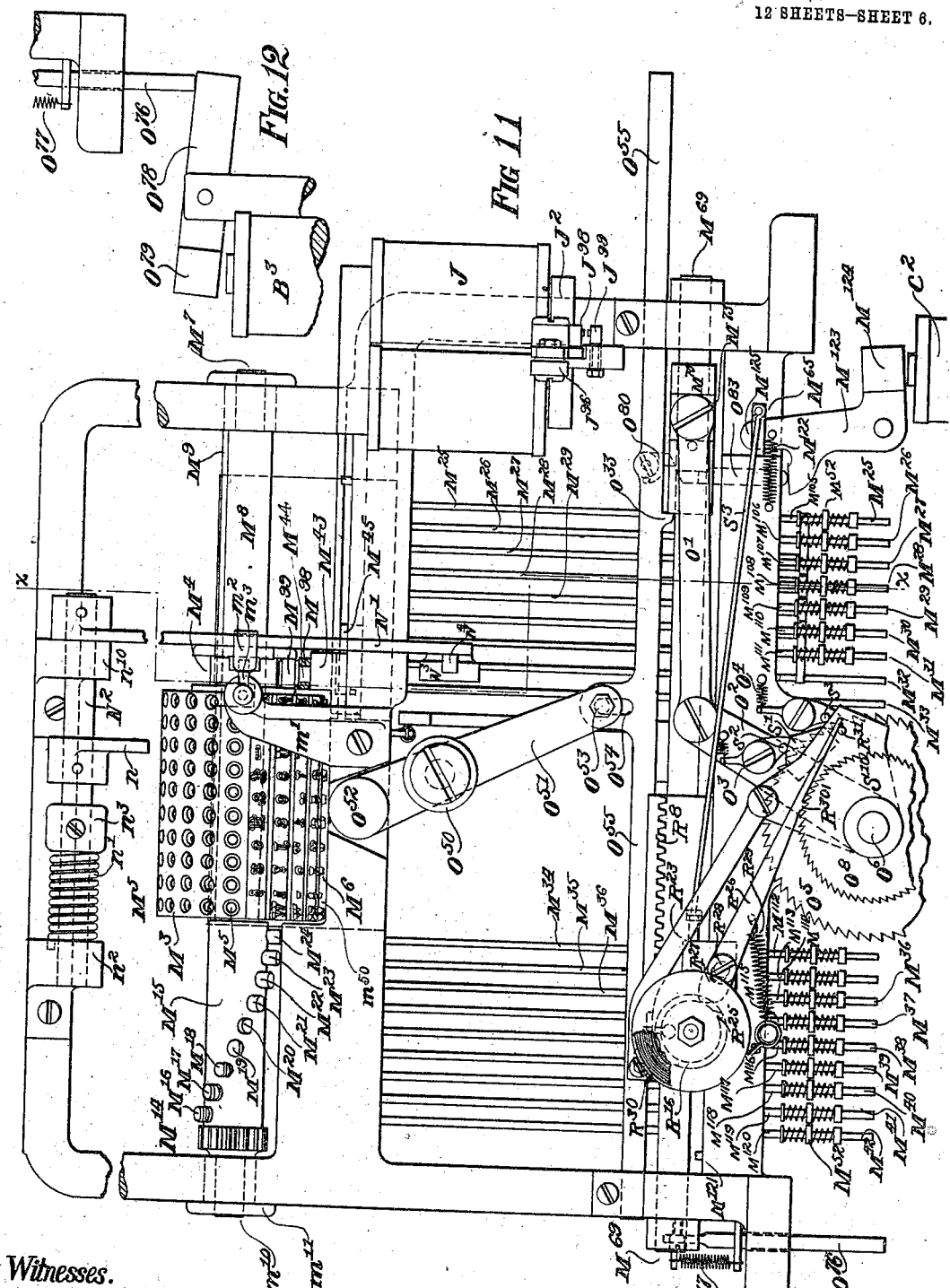
Witnesses.
Inventor
WALTER S. TIMMIS,
BY
ATTORNEYS W. S. TIMMIS.
MACHINE FOR PRODUCING JUSTIFIED LINES.
APPLICATION FILED MAR. 10, 1902.
996,300.
Patented June 27, 1911.
12 SHEETS—SHEET 7.
FIG. 13.
FIG. 14.
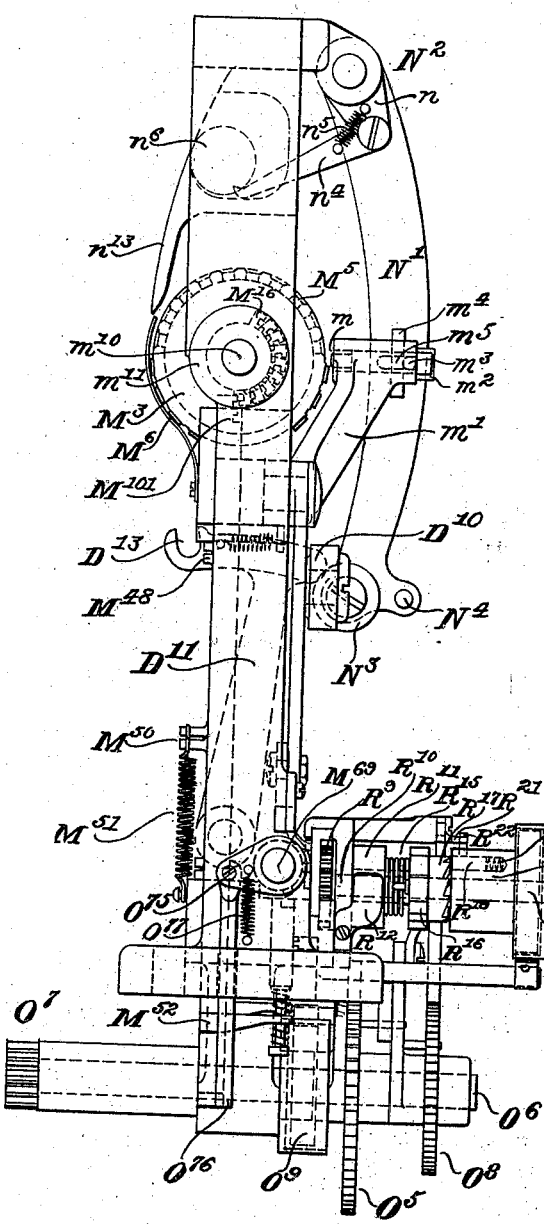
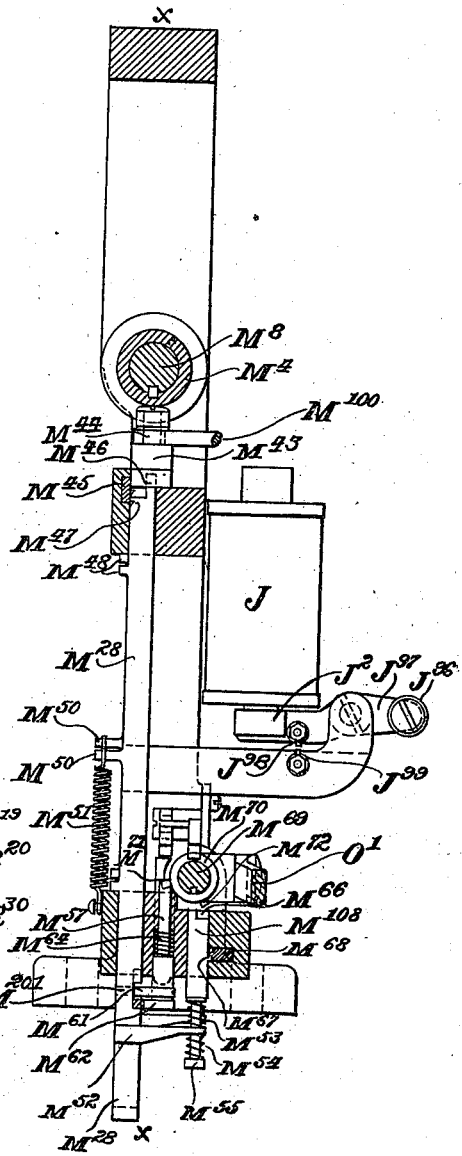
Witnesses.
Inventor:
Walter S. Timmis
BY
Attorneys W. S. TIMMIS.
MACHINE FOR PRODUCING JUSTIFIED LINES.
APPLICATION FILED MAR. 10, 1902.
996,300.
Patented June 27, 1911.
12 SHEETS—SHEET 8.
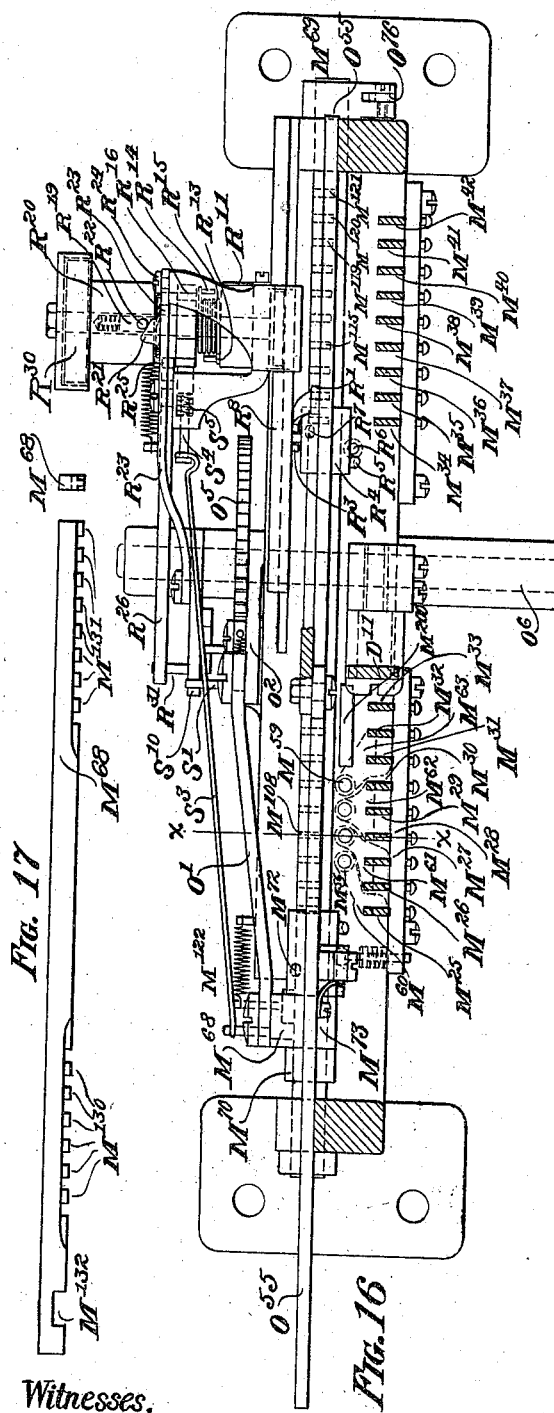
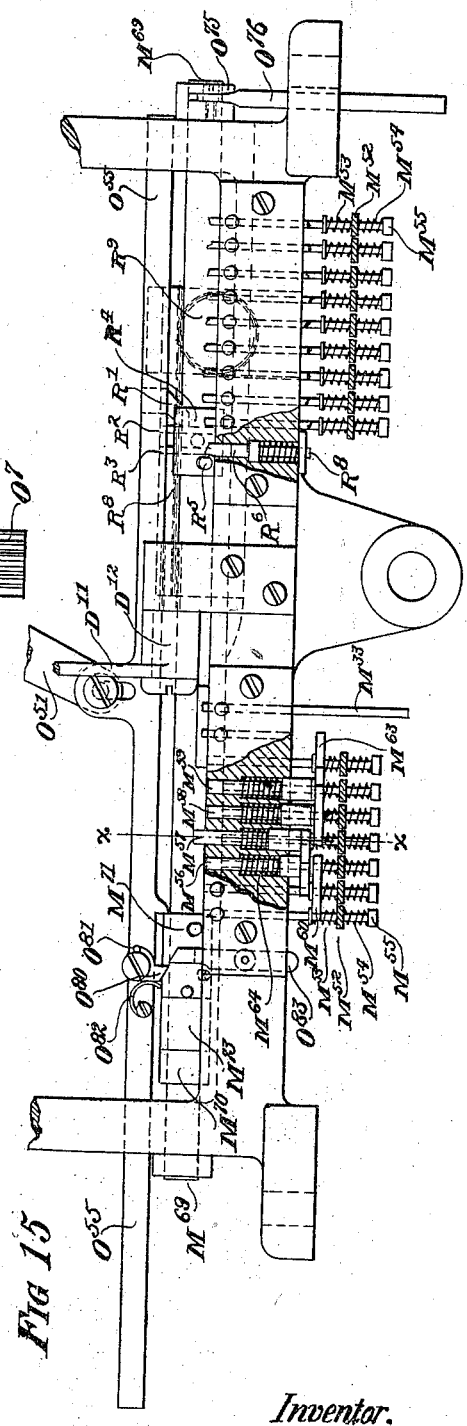
Witnesses.
Inventor.
Walter S. Timmis,
BY
Attorneys.

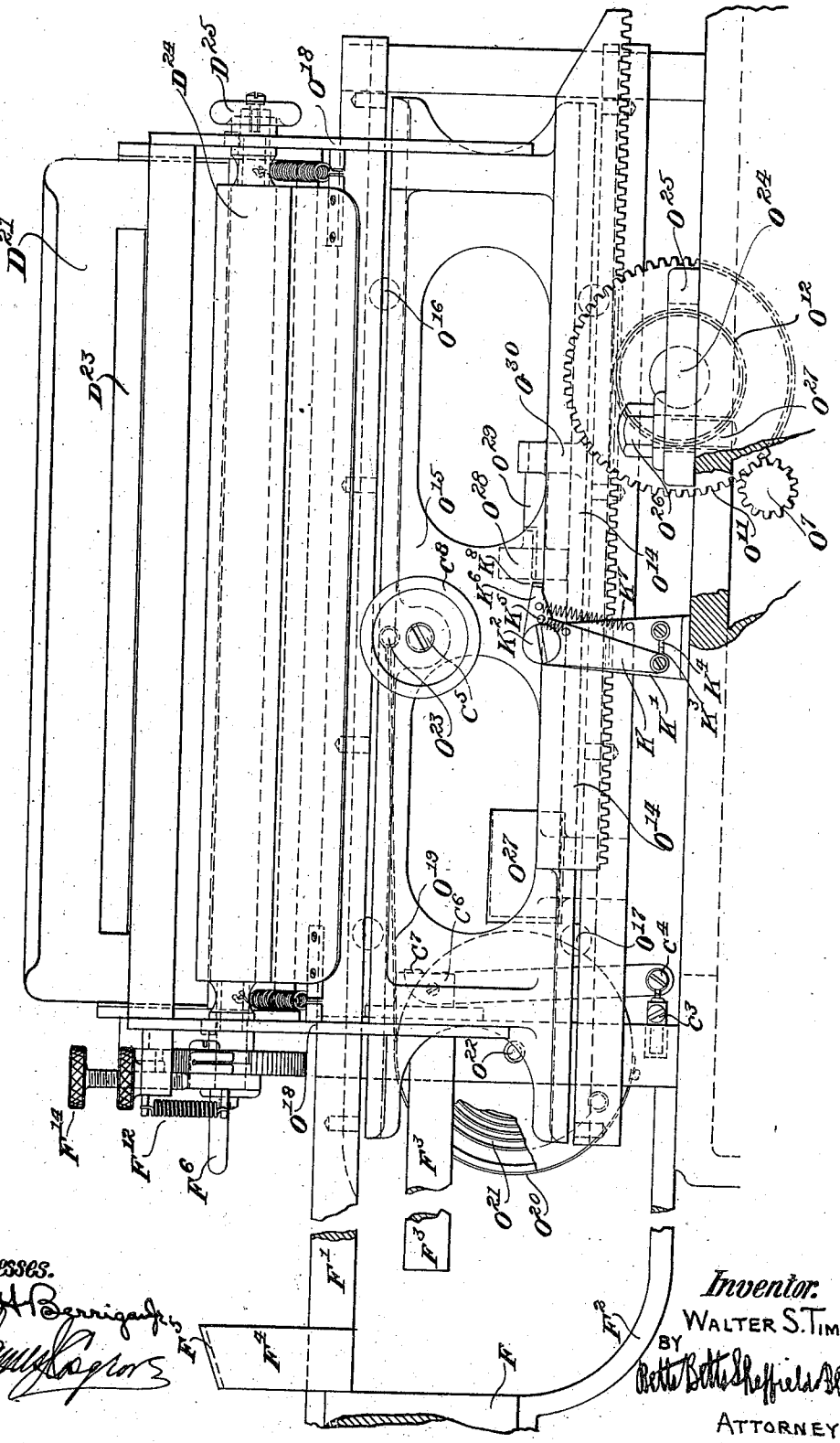

W. S. TIMMIS.
MACHINE FOR PRODUCING JUSTIFIED LINES.
APPLICATION FILED MAR. 10, 1902.

996,300.

Patented June 27, 1911.
12 SHEETS—SHEET 10.

Witnesses.

Inventor:
WALTER S. TIMMIS,
BY
ATTORNEYS.

W. S. TIMMIS.
MACHINE FOR PRODUCING JUSTIFIED LINES.
APPLICATION FILED MAR. 10, 1902.
996,300.
Patented June 27, 1911.
12 SHEETS—SHEET 11.
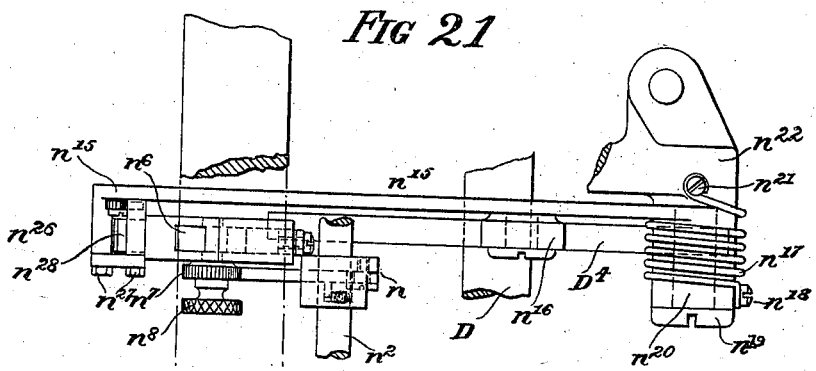
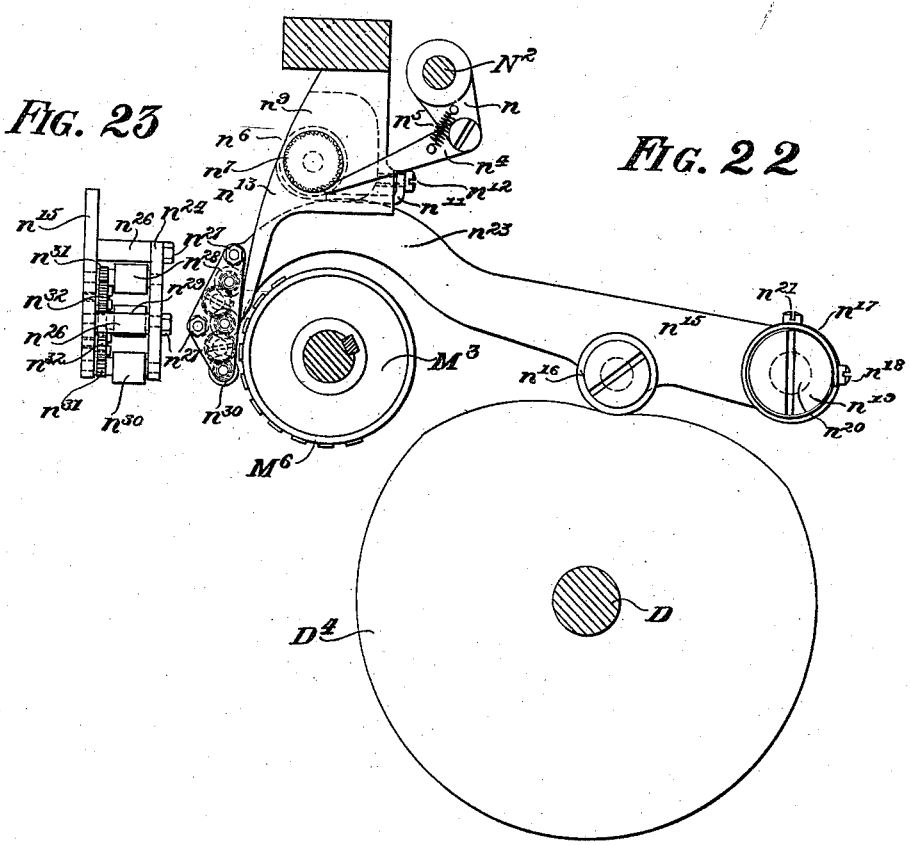
Witnesses.
Inventor.
WALTER S. TIMMIS,
BY
ATTORNEYS.

UNITED STATES PATENT OFFICE.

WALTER S. TIMMIS, OF CRANFORD, NEW JERSEY.

MACHINE FOR PRODUCING JUSTIFIED LINES.

996,300.	Specification of Letters Patent.	Patented June 27, 1911.

Application filed March 10, 1902. Serial No. 97,504.

*To all whom it may concern:*

Be it known that I, WALTER S. TIMMIS, a citizen of the United States, residing and having a post-office address at Cranford, in the county of Union, State of New Jersey, have invented certain new and useful Improvements in Machines for Producing Justified Lines, of which the following is a full and true description, reference being had to the accompanying drawings, showing my present improvements embodied in a machine for printing justified lines.

My improvements relate to pattern-controlled machines for printing, type-casting, type-setting or analogous purposes, and particularly intended to produce justified lines of types or impressions from type. Preferably the machine is designed to be controlled by a perforated pattern produced by a machine of the type illustrated and described in my co-pending application, Serial No. 78,413 filed October 12, 1901 for Letters Patent of the United States. A machine of the class described in said application is adapted to provide a strip with lines of perforations representing characters, with perforations representing spaces between words, with perforations representing the conclusion of lines to be produced, and with perforations representing the average amount of space expressed in units and fractions thereof, to be inserted between the words of the line in order to completely justify the same. It is desirable, however, in the employment of the strip, characterized by the perforations aforesaid, that it shall produce lines of characters, justified between the words of the line, by complete units only, and that the fractions of units, if any, shall be accumulated until equaling unity, and shall be then inserted in the spaces between words. This is especially advantageous as permitting corrections of the lines produced. Thus, for instance, if it is found after an entire line of characters has been produced, that one or more characters have been omitted, the subsequent insertion of such characters will require a reduction of the spaces between the words of the line in order to re-justify the line. If the quads, or other spaces, between such words are cast or formed in units and fractions, then the work of forming and fitting new quads and spaces, for each correction, is infinitely tedious and expensive; but if, on the other hand, when carrying out the method devised by me and described in an application, Serial No. 78,414, filed October 12, 1901 (and for the practice of which method my new machine is especially designed) the spaces between words are expressed in the produced line by complete characters only, then the subsequent insertion or removal of omitted or superfluous characters will be easily compensated for by the substitution, between words, of quads or spaces of complete units only, a stock of which may be kept on hand, and the line completely justified.

My present invention relates to a pattern-controlled machine which, preferably, contains means whereby a movable base or carriage is permitted to move, at the production of spaces as well as characters, by complete units of movement only, and also contains means whereby the fractions of units, if any, represented on the pattern, are accumulated until equaling a unit, and each such unit of movement, as accumulated, is transmitted to the carriage or base. Preferably, the transfer of the accumulated unit is effected only as part of the production of the space between words.

To more clearly illustrate the operation of the justifying mechanism, I cite the following example: Take, for instance, the sentence: " The work is good ", and assume that said sentence is to be set in a predetermined line containing sixty units, and is to completely fill said line. It will be found that the characters of such sentence contain forty-four unit-widths, divided by three spaces between the words. The normal width of each space will, it is assumed, be three units, making the total of characters and spaces fifty-three unit-widths. In order to justify the line exactly, in the instance stated, it will be necessary to insert seven units into the spaces between the words, and to distribute the same as evenly as possible. In order to secure this result, the strip is provided with openings, at the end of the line of representations, with openings representing in units and fractions the amount of average space between the words, in order to completely and equidistantly justify the line. The strip, thus made, is passed through a machine—that illustrated in the accompanying drawings, by preference—and in a direction the reverse of its production. The openings in the strip influence mechanism for operating printing or casting devices, and for perating a holder or base, which moves by complete units of movement only. The first influence exerted by the strip is to set stops, which will indicate the number of complete units which are represented upon the strip to be inserted between words, and also to set other stops which represent the number of fractions of units represented upon the strip to be inserted between words. In the instance under consideration, in order to justify the line completely, it will be necessary to divide sixteen units into the three spaces of the sentence "The work is good". This means an average of a little less than 5.4 units between the words. The strip has been provided with justification-representations indicating 5.4 units, and in my new machine, the 5-unit stop and .4 unit stop are thrown up, and locked, during the production of the entire line. At the first space in the line, the carriage will be moved five units, and the fractions will be accumulated; at the second space, the carriage will again be moved five units, and the fractions are added to those previously accumulated; at the last space of the line, the accumulated fractions, equaling unity, said unit is transferred to the carriage, to which is also given five units of movement. Thus the sixteen units have been inserted into the spaces of the line, and by complete units only. It will be observed that the accumulator still has two fractions of units. In the practical operation of the machine, this excess is rejected, by restoring the accumulator to zero, which occurs at the conclusion of a line.

Throughout this specification, I desire to be understood, when using the word "units", as referring to type-units. In the printing arts, each type contains a certain number of units, by which is meant unit-widths, and the said measure, units, is preferably employed by me.

Figure 24:
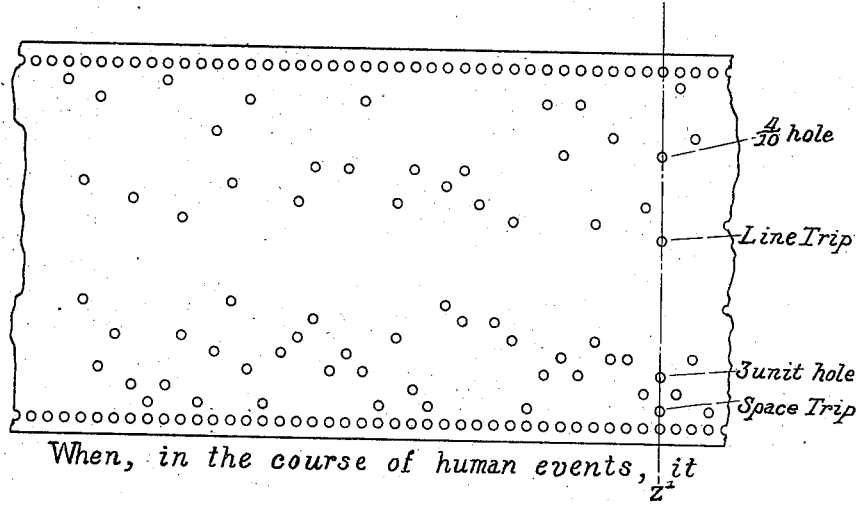

Referring to the accompanying drawings, Figure 1 is a front view of a pattern-controlled printing-machine, embodying my present invention; and Fig. 2 is a top view of such machine. Fig. 3 is a diagram showing the electrical connection and relation of the parts of the machine. Figs. 4 and 5 are respectively side and rear views of the pattern-feeding devices and circuit-closers, rendered operative or inoperative by the pattern; and Fig. 6 is a small sectional detail, illustrating the insulation of the circuit-closer frame from its operating lever. Figs. 7, 8, 9 and 10 are views of the electrical clutch and lock therefor, Fig. 7 showing a longitudinal section of the details of the clutch and driving and driven connections, and a view of the clutch-lock; Figs. 8 and 9 are fragmentary details, showing relations of clutch, and clutch-lock and magnet therefor; and Fig. 10 is a sectional detail, showing the clutch disconnected and locked, and the contacts of the circuit of the clutch-lock magnet separated, whereby the circuit of said magnet is broken. Fig. 11 is a view of the front of the machine, separated from the base, and with the driving parts, clutch and main shaft removed. Fig. 12 illustrates the relation of the magnet and its armature with the rod for rocking the carriage-operating sleeve-carrying shaft, when spaces are to be produced between words. Fig. 13 is a left end view of Fig. 11, especially showing a means for locking the type-cylinder when positioned, and Fig. 14 is a vertical section on the line $x$ $x$ of Fig. 11, illustrating coöperation of the various stops employed. Fig. 15 is a rear view of the lower portion of Fig. 11, and Fig. 16 illustrates a top view of the fragment illustrated in Fig. 15. Fig. 17 illustrates a sliding rack, employed to lock into position the units-stops and the fractions-stops of the justification-mechanism. Fig. 18 is a rear view of the carriage and its driving gear. Fig. 19 is a right-hand end-view of the carriage, showing the new-line operating device and adjustment therefor. Fig. 20 is a vertical section, looking toward the right, of the printing-mechanism, showing mechanism for advancing the paper to the type-cylinder; Figs. 21 and 22 are, respectively, top and side views of the inking-mechanism; Fig. 23 is a rear view, showing relative arrangement of the rolls of such inking-mechanism; Fig. 24 is a view of a portion of a strip provided with openings for producing the printed justified line "When, in the course of human events, it"; and Figs. 25 and 26 are, respectively, side and top views of portions of Fig. 2, illustrating the buffer devices of the impression-taking means.

The preferred form of mechanism, especially when the machine is to be employed for printing, by succesive characters, lines of impressions, embodies the following mechanisms: a movable pattern-mechanism, a contact-table, a contact-frame, a main-shaft, a cam thereon for operating the pattern-mechanism, a movable character-bearing body, one or more cams on the main shaft for moving the character-bearing body, stops controlled by the pattern-mechanism for positioning the character-bearing body in accordance with the representations on the pattern, a paper-carrying traveling carriage, carriage-driving mechanism, stops controlled by the pattern-mechanism for regulating the travel of the carriage, automatic connections, also controlled by the pattern-mechanism, for returning the carriage to initial position, automatic means for moving the paper to present a new line for printing, inking means, impression-taking means, means for regulating the force of the impression-taking means according to the width of the character to be impressed, a clutch and means for automatically operating the same at the end of a line, and at other times for safety, various safety and protective devices, and means for justifying a line by operating the carriage in accordance with complete units only, and by accumulating fractions of units and inserting the units thus accumulated at the spaces in the line.

*Pattern-mechanism.*—The preferred pattern-mechanism, or pattern-feeding mechanism, is especially shown in Figs. 1, 2, 4, 5 and 6 of the accompanying drawings. The principal electrical connections thereof are diagrammatically illustrated in Fig. 3.

$A^1$, $A^1$, indicate upright frames or castings, each provided with an upper arm, $A^2$, for supporting the shaft, which moves the feed-rolls and circuit-closers, and each provided with a lower arm, $A^3$, supporting the roll, $A^4$, from which the perforated pattern-strip is unwound. Said roll is provided with end-disks $A^5$, for protecting the pattern and assuring a straight feed thereof. The roll is removable from between the frame, in order to wind the strip, and is recessed at one end to receive the pin $A^6$ fixed in the frame, and movable to release roll $A^4$ by means of knob $A^7$. A spring $A^8$, wound around the pin $A^6$, presses against one side of roll $A^4$, and thus holds it yieldingly between the frames, in order that when the pattern is drawn from the roll, as by mechanism hereinafter described, there will be no slack of the strip.

The mechanism for positively feeding the pattern, and in defined quantity, from the roll $A^4$, comprises a lower roller $A^9$ and an upper roller $A^{10}$, the last being supported in slots of the frames for ready removal. For the purpose of positively moving the rollers together, and to engage with guide-openings in the strip, near both edges, the lower roller is provided with two rows of equidistant radially-arranged teeth, $A^{11}$, near the ends of the roller, and the upper roller is provided with recesses, $A^{12}$, with which the teeth $A^{11}$ register. To readily disengage the strip, after being drawn between the rolls, from the teeth, $A^{11}$, the machine is provided with a curved stripper-plate $A^{13}$ (Figs. 1 and 4) which touches the lower roller at about the point of contact with roller $A^{10}$, and gradually separates from said surface.

The roller $A^9$ is fixed upon an axle $A^{14}$ (see Fig. 4), and at one end of said axle is fixed a ratchet $A^{15}$. This ratchet is engaged and driven by a pawl $A^{17}$, integral with the lower end of an arm $A^{16}$. A retaining pawl $A^{18}$ is pivoted upon the frame, and is drawn into engagement with the ratchet by means of a spring $A^{19}$, the opposite ends of which are connected respectively to the retaining pawl and to the arm $A^{16}$. Referring now to said arm, $A^{16}$, this is hung from the outer end of an arm, $A^{20}$, the inner end of which is secured to an oscillatory shaft $A^{21}$ (Figs. 1, 2, 4 and 5). This shaft, at the opposite side of the pattern-mechanism, carries an arm, $A^{22}$, projecting in the same direction as arm $A^{20}$, and provided at its extremity with a roller $A^{23}$. Such roller $A^{23}$ bears upwardly (see Fig. 1) against the periphery of cam $A^{24}$ carried by the main shaft D of the machine, said cam being so related to the other parts of the machine, and having a recessed portion formed therein for the roller $A^{23}$, as to operate the reciprocatory shaft, $A^{21}$, at the times desired, in one direction. A spring $A^{25}$ (Figs. 1, 2 and 5) wound around the shaft $A^{21}$, and connected at one end to a side frame $A^2$, and to a collar made fast to the shaft, operates such shaft in opposition to the cam $A^{24}$. Upon the shaft $A^{21}$, and about equally distant between the side-frames $A^2$, is fixed an arm, $A^{26}$, the outer end of which is connected to a depending link, $A^{27}$, the lower end of which carries a rectangular frame, consisting of top and bottom bars, $A^{28}$ and $A^{29}$, and side-bars $A^{30}$.

By the arrangements already described, it will be obvious that the cam $A^{24}$, and spring $A^{25}$ give a rocking movement to the shaft $A^{21}$, and cause the arm $A^{16}$ to engage and operate the ratchet $A^{15}$ during the upward movement of the frame, and to operate without effect upon the ratchet during the downward movement of the frame. The frame referred to carries a plurality of circuit-closers, especially shown in Fig. 5. Preferably, the circuit closers consist of a plurality of slender pins, passing through openings in the upper and lower bars, $A^{28}$ and $A^{29}$, of the frame, and each being surrounded by a coiled spring $A^{50}$; said springs having one end bearing against bar $A^{28}$ and their other ends bearing against collars carried by the pins. In Figs. 3 and 5, said pins are lettered in the order illustrated, as follows: B, $A^{31}$, $A^{32}$, $A^{33}$, $A^{34}$, $A^{35}$, $A^{36}$, $A^{37}$, $A^{38}$, $A^{39}$, C, $A^{40}$, $A^{41}$, $A^{42}$, $A^{43}$, $A^{44}$, $A^{45}$, $A^{46}$, $A^{47}$ and $A^{48}$. All of the pins above lettered may be carried, by the connections aforesaid, into and out of circuit-closing position with similarly-arranged wires projecting upwardly through a fixed bar $A^{49}$, being there insulated by the material of the bar or in any other desired way.

The sliding frame is insulated from the side-frames $A^1$, by means of insulating material, $A^{53}$, as vulcanized rubber, placed between fixed slide-ways $A^{51}$ and the inner sides of the side-frames $A^1$, and secured in place by screws $A^{52}$ passing through the slide-ways and side-frames, and the sliding frame is also insulated from the oscillatory shaft $A^{21}$ by a non-conductive sleeve $A^{74}$ (see Fig. 6) surrounding the pivotal screw $A^{72}$ and locked in place by nut $A^{73}$. This insulated sleeve, $A^{74}$, prevents electrical contact between the link $A^{27}$ and the arm $A^{26}$, secured to the oscillatory shaft.

The sliding frame is connected in any desired way with a supply wire. As hereinafter described, the connection from the frame to the source of current is indirect, being controlled by a rotary switch and safety-devices.

The wires leading downwardly from the bar $A^{49}$ are lettered in the order illustrated (see especially Fig. 5) as follows: $B^1$, $A^{54}$, $A^{55}$, $A^{56}$, $A^{57}$, $A^{58}$, $A^{59}$, $A^{60}$, $A^{61}$, $A^{62}$, $C^1$, $A^{63}$, $A^{64}$, $A^{65}$, $A^{66}$, $A^{67}$, $A^{68}$, $A^{69}$, $A^{70}$, and $A^{71}$. Referring now to the diagram (Fig. 3), the connections of the said wires are shown. Wire $B^1$ is connected to branch wires $b^1$ and $b^2$, the former of which leads to an electro-magnet $B^2$, hereinafter called the "printing interrupter magnet", and from thence by wires $b^{10}$ and $b^8$ to generator Z; and the second branch, $b^2$, leads to a magnetically-controlled circuit-closer $b^3$, and from thence by wire $b^4$ through electro-magnet $B^3$, hereinafter called the "space-rotating magnet", thence by wire $b^5$, magnetically-controlled circuit-closer $b^6$, wire $b^7$ and wire $b^8$ to the generator. Normally, the circuit-closers $b^3$ and $b^6$ are held by springs or otherwise in circuit-closing position, and the circuit therethrough is broken at each circuit-closer, when the controlling magnet thereof is energized, as hereinafter described. The wire $C^1$ is connected to two branch wires, respectively lettered $f$ and $c$. The first-named of these connects, through the coil of a solenoid F, with a wire $f^1$ and an electro-magnet G (that controlling the operations of the circuit-closer $b^6$) hereinafter designated "pawls release magnet", and with the wire $b^8$. The second-named branch, $c$, connects with an electro-magnet $C^2$, hereinafter called the "line-trip magnet", and with the contacts $C^3$ and $C^4$ of a circuit-closer, and thence by wire $c^1$ through a magnet H, hereinafter called the "brake magnet.", and wire $b^8$. The remaining wires $A^{54}$–$A^{71}$ are connected with electro-magnets as follows: wire $A^{54}$ connects with magnet $A^{72}$, and $A^{55}$ connects with magnet $A^{73}$, wire $A^{56}$ connects with magnet $A^{74}$, wire $A^{57}$ connects with magnet $A^{75}$, wire $A^{58}$ connects with magnet $A^{76}$, wire $A^{59}$ connects with magnet $A^{77}$, wire $A^{60}$ connects with magnet $A^{78}$, wire $A^{61}$ connects with magnet $A^{79}$, wire $A^{62}$ connects with magnet $A^{80}$, wire $A^{63}$ connects with magnet $a^1$, wire $A^{64}$ connects with magnet $a^2$, wire $A^{65}$ connects with magnet $a^3$, wire $A^{66}$ connects with magnet $a^4$, wire $A^{67}$ connects with magnet $a^5$, wire $A^{68}$ connects with magnet $a^6$, wire $A^{69}$ connects with magnet $a^7$, wire $A^{70}$ connects with magnet $a^8$, and wire $A^{71}$ connects with magnet $a^9$. All of the electro-magnets $A^{72}$–$A^{80}$ and $a^1$–$a^9$ are connected by a common wire, I, with the wire $b^{10}$ and to the generator Z by wire $b^8$.

As hereinafter described, the magnets $A^{72}$–$A^{80}$ control the operation of bars which (1) set stops for limiting the movements in one direction of a character-bearing or other body, (2) set stops which control the movements of a traveling carriage upon the imprinting or production of a character, and (3) set stops which control the movements, computed by complete units only, of the carriage upon the production of a space in a line of such characters; and the magnets $a^1$–$a^9$ control the operation of bars which (1) set stops for limiting the movements of the character-bearing body aforesaid in a direction different from that first named, and (2) set stops for accumulating, in a mechanism such as hereinafter described, fractions of units included in the average amount of space necessary to exactly justify a line.

*Detector device.*—The machine is provided with a device, preferably comprising an electro-magnet, which automatically causes stoppage of the machine, by disconnecting it, braking it or otherwise, when the pattern is not provided with controlling perforations. This will occur at the conclusion of an article, such, for instance, as the end of a chapter of a book, when there will be a portion of the pattern left blank or unprovided with perforations. In such event, it is desirable that the machine shall be stopped, in order that the produced characters or impressed matter may be removed from a machine. My improved machine is provided with means for automatically accomplishing the stoppage of the machine.

In the preferred machine, I employ an electro-magnet J, hereinafter designated the "detector magnet," included in series with the supply wire $J^1$, leading to the contact-frame and with an automatic switch K, shown in detail in Fig. 18 and hereinafter designated "emergency stop," and with the contacts T and S bridged by a rotary switch $L^1$ (see especially Fig. 3) carried by the main shaft D.

The electro-magnet J is provided with an armature $J^2$ (Figs. 1, 3, 11, 14) connected to a lever which carries a contact $J^{98}$, and the rear arm $J^{97}$ of such lever carries a roller $J^{96}$. This roller is caused, by the weight of the armature, to bear upwardly against a cam (see Figs. 1 and 2) $J^{95}$ formed on the sleeve of cam $A^{24}$. The said cam, $J^{95}$, alternates with the electro-magnet J to separate the contact $J^{98}$ from a contact $J^{99}$, for the purpose hereinafter specified.

*Main shaft and cams.*—The main shaft is provided with a plurality of cams (see especially Figs. 1, 2, 20 and 22) as follows:

(1) the cam $A^{24}$, hereinafter described, for operating the circuit-closer frame and pattern-feeding mechanism, (2) a cam $D^1$ acting to drive, in one direction, a lever which longitudinally moves a character-bearing body, a type-cylinder being employed, (3) a cam $D^2$ acting to revolve the shaft upon which the type-cylinder is fitted, (4) a cam $D^3$ for moving a lever for operating the carriage-driving mechanism, (5) a cam $D^4$ for moving an inking-mechanism, (6) a cam $D^5$ for locking the type-cylinder in selected position, (7) a cam $D^6$ for oscillating a paper-holding frame on the traveling carriage in order to move the paper to impression-taking position, and (8) a cam, $J^{95}$, operating upon the lever arm $J^{97}$. The main shaft also carries and drives a rotary switch comprising a main contact $L^1$ and branching-plates $L^2$ and $L^3$, situated at opposite sides of $L^1$.

*Clutching and braking devices.*—The machine is provided with an automatically-operating clutch, for connecting the machine with and disconnecting it from a driving device, such as a pulley and shaft. I prefer to employ a device substantially like that illustrated in the accompanying drawings. This includes a combined clutch and brake, and operates to simultaneously disconnect the machine and apply braking pull to the main shaft, and to simultaneously connect the machine and remove the brakes.

Referring now to Figs. 7, 8, 9 and 10, I have shown a form of electro-magnetically-controlled combined clutch and brake, together with a means for automatically locking the device in disconnected and braked position as hereinafter explained. D indicates the main shaft, and E the driving shaft supported in a casting, $H^3$, of the machine. A driving pulley $H^4$ (Figs. 1 and 2) is secured upon such driving shaft. H indicates an electro-magnet secured to an upright $H^{75}$. $H^1$ indicates a ring clutch, slidably fitted by key-way and key upon the main shaft. $H^5$ indicates a coiled spring fitted around a collar $H^6$, which bears against the upright $H^{75}$, and through which the shaft passes. The ends of such spring bear respectively against the inner side of the upright and against the slidable ring $H^1$. $H^2$ indicates a fixed ring, secured to the extremity of the shaft E. Both $H^1$ and $H^2$ are provided with interfitting teeth and depressions, $H^7$, and when the ring $H^1$ is advanced by the spring $H^5$ it engages and is driven by the driving ring $H^2$, whereby motion is communicated to the main shaft D of the machine.

It will be noticed that the inner edges of the ring $H^1$ and the outer edges of the magnet H are correspondingly beveled. When, therefore, the magnet is energized, the attracted ring $H^1$, operating against the compression of the spring $H^5$, will be brought solidly against the magnet, and will be simultaneously disconnected from the driving member $H^2$. The pull exerted by the magnet H upon the ring will, of course, prevent rotation of the latter, and the ring being keyed upon the main shaft D will hold the latter against rotation. From this, it will be seen that the arrangement shown simultaneously and by a single device disconnects the machine and applies braking power thereto.

Under certain circumstances, as hereinafter explained, as, for instance, when the pattern-strip contains no perforations, as at the end of an article, the machine after having been automatically disconnected, is to be maintained in such relation, and I have therefore provided a lock or catch to accomplish this purpose. The preferred form comprises an electro-magnet $H^8$, hereinafter designated the "clutch-holder magnet", and which (see Fig. 3) is included by wire $J^3$, in circuit with a circuit-closer carried by the armature $J^2$ of the "detector magnet" J, and which is also included by conductors and by self-governed contacts $H^{18}$ and $H^{19}$, hereinafter described, in series with the "brake magnet" H.

The electro-magnet $H^8$, as shown in Figs. 7, 8, 9 and 10, is provided with an armature $H^9$ secured to a vertically-disposed rocking shaft $H^{76}$, upon the upper end of which is fitted a locking arm $H^{10}$ provided, at its extremity, with a hook $H^{11}$. The slidable ring $H^1$ is provided with an annular groove $H^{12}$ shaped to receive the hooked end of the locking arm $H^{10}$. The lower end of the vertical shaft $H^{76}$ is provided with an upper contact arm $H^{14}$ which is fitted to the shaft, and a lower contact arm $H^{15}$ which is movable independently of the shaft. A spring $H^{16}$ connected to both arms normally tends to hold contacts $H^{17}$ and $H^{18}$, one carried by each arm, in circuit-closing position. Thus when the "clutch-holder magnet" $H^8$ is energized, the attraction of its armature not only throws the arm $H^{10}$ to locking position, but also throws forward the arm $H^{14}$ and with it, by reason of the connecting spring $H^{16}$, the arm $H^{15}$, maintaining the circuit through the magnets $H^8$ and H constantly closed. This would be undesirable, from the fact that if the machine is left disconnected and locked for a long time, the magnets H and $H^8$ would become overheated and might be burned out or short-circuited. I have therefore provided means for separating the contacts $H^{17}$ and $H^{18}$ upon the arms $H^{14}$ and $H^{15}$, when the clutch is securely locked, and other means whereby the locked parts are mechanically held in that relation. Extending upwardly from the base of the machine is a trip-pin $H^{19}$, over the top of which the arm $H^{14}$ moves without interference, but which pin is in the path of movement of the arm $H^{15}$. The outer end of arm $H^{14}$ is slotted or forked, and a pin $H^{20}$, carried by the short arm of a lever $H^{21}$, is adapted to move the said fork. $H^{22}$ is a handle for manually throwing the lever, and $H^{23}$ is a spring connected to the pin $H^{20}$ and to the machine, and operative to hold the lever in either the locking or unlocking position.

$H^{24}$ is a stop against which the lever rests in the first-named position.

The normal position of the parts is shown in Figs. 7 and 8, wherein the clutch engages the driving gear, and the magnet $H^8$, being inoperative, the locking arm is drawn away from ring $H^1$. It will be seen that the lever $H^{21}$ is thrown to the extreme left of its pivot, the screw $H^{25}$, and that the arm $H^{14}$ moved by the pin $H^{20}$, is thrown outwardly, and by reason of the engagement of contacts $H^{17}$ and $H^{18}$ has also thrown the arm $H^{15}$ outwardly. When, however, the "clutch-holder magnet" $H^8$ is energized, the shaft $H^{76}$ is turned and the arm $H^{14}$ draws the arm $H^{15}$ forward until stopped by the trip-pin $H^{19}$, and meanwhile has also drawn the short arm of the lever $H^{21}$ until the line of pull of the spring $H^{23}$ is to the rear of the center of the pivot screw $H^{25}$, whereupon the said spring completes the locking movement of the parts and the separation of the contacts $H^{17}$ and $H^{18}$. In this position the parts will remain until manually restored by the operation of the lever $H^{21}$.

The pattern-feeding mechanism, the detector-device, the main-shaft and cams, the automatic clutches, etc., hereinbefore described, have been illustrated in connection with a machine for printing. It is obvious, however, that said mechanisms may be employed, in substantially the same manner and combinations, in other machines for producing or assembling lines of types or impressions, such as type-casting machines, type-setting machines, linotype machines, matrix-making machines, etc.

*Type-cylinder and positioning.*—The machine is provided with printing means of any desired form, whereby characters will be impressed, singly and successively, upon or in a base. Preferably, however, the machine is designed to print justified lines upon a sheet or strip of paper, and especially in order that the reading matter thus set up may be transferred to a lithographic base, such as an aluminum plate or a stone. While my invention, broadly considered, includes in pattern-controlled machines, all arrangements of mechanisms whereby printing or impressing types or characters will be individually selected and impressions taken therefrom, I preferably employ a body bearing all of the characters to be employed, and move such body so as to bring the characters to a common printing or impression-taking point. For this purpose, I employ a type-bearing cylinder $M^3$ (see Figs. 1, 2, 11, 13 and 14) carrying a collar $M^4$. A lever $M$ is provided with a roller $M^1$ bearing against and driven by the surface of the cam $D^1$, on the main shaft, in one direction, and returned by the spring $M^2$ in the other direction. The cylinder is provided with a plurality of locking-openings, $M^5$, into which a locking pin, hereinafter described, registers. Said cylinder is also provided with printing type, $M^6$, arranged thereon in ten consecutive rows and in accordance with the fatness of the characters to be printed, characters of equal type-unity being arranged in the same row.

$M^8$ indicates a rotatable shaft having reduced ends fitted between the arms of the machine-frame.

The cylinder is mounted upon the rotatable shaft $M^8$, by means such as a spline $M^9$ on the shaft of a corresponding groove of the cylinder, which permits the reciprocation of the cylinder on the shaft irrespective of the movements of the latter.

$M^{10}$ (Figs. 1 and 2) indicates a lever, raised by the cam $D^2$ of the main-shaft in contact with a roller $M^{12}$ carried by the lever, and returned by means of a coiled spring $M^{11}$. The free end of the lever $M^{10}$ is provided with a circular gear sector $M^{13}$ which meshes with a gear-wheel $M^{14}$ carried by the right end of the enlarged part $M^{15}$ of the shaft $M^8$.

The preferred connections between the lever $M$ and the type-cylinder, whereby the latter is reciprocated, are as follows: The inner arm of the lever $M$ is connected with a stud $M^{44}$, extending upwardly from sliding block $M^{43}$ mounted for reciprocation in guideways formed in the machine. The stud $M^{44}$ also carries a roller, $M^{99}$, located between the walls of the collar $M^4$, whereby the cylinder is allowed to freely rotate while being reciprocated. The reciprocating block $M^{43}$ is arranged, as hereinafter described, to interlock with the stops which are set to control the longitudinal return of the cylinder.

In operation, the lever $M$, driven by the cam $D^1$, will always move the cylinder longitudinally of the shaft $M^8$ and toward the left to an extreme position, and the lever $M^{10}$, driven by the cam $D^2$, will always oscillate the cylinder upwardly to an extreme position. In Fig. 11 of the accompanying drawings, I have shown the cylinder when thrown to the extreme positions spoken of. When the cams cease operating the levers $M$ and $M^{10}$, the springs $M^2$ and $M^{11}$ will tend to throw such levers back to normal position, and consequently to restore the cylinder, by oscillating and reciprocating the same to zero position. In order to control the movements of the cylinder, and thereby the selection of the particular character desired, I cause the interposition (by means under control of the pattern strip) of stops which limit the oscillatory return of the cylinder and of stops which limit the reciprocatory return of the cylinder. The mechanical connections for selecting and operating such stops will be hereinafter described.

The enlargement $M^{15}$ of the shaft $M^8$ may be provided (see Figs. 11 and 13) with a plurality of spirally-disposed radial pins, $M^{16}$ to $M^{24}$, which serve as the means for engaging stops and thus limiting the oscillatory return of the cylinder, as hereinafter described.

*Type-arrangement.*—The type or characters $M^6$ carried by the cylinder may be disposed thereon in any desired way. Preferably, however, there are ninety-nine characters, and these are arranged upon the cylinder in circumferential rows, all characters of a row being of the same fatness or width. In the instance illustrated, I have found it advisable to have ten equidistant circumferential rows, and divided as follows: one row of two-unit characters; two rows (twenty) of three-unit characters; three rows (thirty) of four-unit characters; two rows (twenty) of five-unit characters, and two rows (one containing ten characters and the other containing nine characters) of six-unit characters. The characters are preferably equidistantly located in the circumferential rows, and thus are alined in longitudinal rows. In order, then, to bring any desired character to a common point, where an impression may be taken, stops, operated by connections hereinafter explained, are usually set or interposed as follows: The cylinder having been moved rotatively and circumferentially, by movements of the levers M and $M^{10}$, the maximum distance, one of a series of stops for arresting, at the impression-taking point, the reciprocal position of the cylinder is set, such stop, selected by the pattern-mechanism as hereinafter described, corresponding to the circumferential row in which the desired character is located, and in addition one of a second series of stops for arresting, at the impression-taking point, the rotary position of the cylinder is set, this stop also being selected by the pattern-mechanism, and corresponding to the position, in the row selected as aforesaid, of the particular character required. It is obvious, however, that if the selected character is located in the last circumferential row of the cylinder, it will not be necessary to operate a stop of the first-named series; also that if the selected character is located in the last longitudinal row, operation of any stop of the second-named series is unnecessary. Lastly, it is obvious that if the selected character is the last of the circumferential row, setting of any arresting stop may be dispensed with.

In order to secure clear, sharp and uniform impressions from all of the characters of the cylinder, irrespective of the shapes of such characters, the surfaces of the characters are disposed at varying heights from the surface of the cylinder. It has been found in practice that the smaller the surface of a character or the sharper its lines, the deeper and poorer will be the impression when the paper is forced against the type. I have also discovered, however, that if the characters are of different heights from the surface of the cylinder, the types of least surface area or of the sharpest lines being the lowest, or being the smallest distance from the surface of the cylinder, and the other types being at heights or distances, from the surface of the cylinder, corresponding to the area or sharpness of the printing surface of the character, clear, sharp and uniform impressions will be taken from the cylinder, more especially when the impression-taking means, as hereinafter described, has a yielding or compensating part, which will absorb or minimize the force of the impression-taking stroke according to the height of the characters.

Referring to Fig. 11, I have shown the cylinder as being provided with types of different heights. Especial reference is to be had to the period indicated at $m^{50}$ in said figure. A period, as is well known, is the sharpest character and the one having the least surface, and in order that the paper when forced against the period shall not be punctured or distorted, I have made this the lowest in height on the cylinder.

*Cylinder substitution.*—It will be readily understood, of course, that in order to change the style, size or language of the characters, the type-bearing surface may be readily removed from the machine. One way of accomplishing this is to mount the type-cylinder on a shaft $m^{10}$ passing entirely across the frame, and locked in place by bushings $m^{11}$ (Figs. 11 and 13). These bushings (either or both) may be unlocked, the shaft $m^{10}$ drawn out sufficiently to permit the removal of the type-cylinder and substitution of another, and the specified parts are returned to illustrated position.

In the operation of the machine, therefore, it is possible to print several styles of characters.

*Cylinder-locking means.*—The machine is provided with means for securely holding or locking the cylinder in any arrested position, and for this purpose I may use many arrangements of devices. As shown in the drawings, the preferred arrangement includes providing the cylinder with a plurality of openings, corresponding in number and relative arrangement with the type carried by the cylinder, and a pin moved by an arm and adapted to register with the openings of the cylinder.

Referring especially to Figs. 1, 11 and 13, it will be seen that the type-cylinder is provided with a plurality of openings, $M^5$, arranged in longitudinal and circumferential rows corresponding to the rows of type or characters $M^6$ carried by the cylinder. The pin for registry with said openings is shown at $m$, especially in Fig. 13. It is loosely fitted in a suitable guide-opening in a support or bracket $m^1$, and preferably it is so constructed or connected that if the type-cylinder is not arrested so as to have the pin $m$ register with an opening $M^6$, then the said pin or the means for operating it will yield to prevent breakage of the pin, cylinder or other part of the machine. The illustrated means for accomplishing this, shows an arm $N^1$ secured to rocking bar $N^2$, and carrying, about midway of its length, a yielding strip, $m^2$, of metal, the free end of which bears upon a projection or angular extension $m^3$ of the pin $m$. The side of the support $m^1$ is slotted as at $m^5$ (Fig. 13), and the projection or extension $m^3$ extends outwardly through said slot. The arm $N^1$ is provided with a plate, $m^4$, on the side nearest the pin, and the outer end of the projection or extension $m^3$ fits between said plate and the yielding end of the strip $m^2$. Thus, when the arm is moved forwardly, the strip will drive the pin into an opening $M^5$ of the cylinder, if the registry of pin and opening is accurate; if such registry is inaccurate, however, the strip $m^2$ will yield, and breakage will be prevented. Upon the return of the arm $N^1$, the plate $m^4$ will positively engage the projection $m^3$ and positively remove the pin $m$ from the opening in the cylinder. For the purpose of operating the arm $N^1$, a cam $D^5$ is carried by the main shaft, and I provide said cam with a cam rib, which passes between the roller $N^3$ (Figs. 11 and 13) and pin $N^4$. By this arrangement, the arm $N^1$ is positively driven in both directions to operate the locking-pin $m$, and said pin is positively held in locking position.

While I have herein shown and described a character-bearing body provided with type in relief, it is obvious that the character-impressing or producing means carried by such body may be any of those well known to persons skilled in the printing arts, and will depend upon the kind of work to be produced by the machine.

It will, of course, be understood that when I speak of a type-bearing cylinder in the claims, such expression is, in nearly every instance, to be understood as covering a cylindrical body bearing any suitable character-impressing or producing means.

*Ink-feeding devices.*—The preferred mechanism has means for feeding ink, in predetermined quantity, to a mechanism for inking the type of the cylinder $M^3$.

Referring especially to Figs. 11, 13 and 22, it will be seen that the preferred connections for operating the ink-feeding device may be moved by the cylinder-locking means. The arm $N^1$, as previously pointed out, is secured to a rocking-shaft $N^2$. Such shaft is fitted in the forwardly-extending supports, $n^2$ and $n^{10}$, secured to the cylinder-carrying frame. A collar $n^3$ is locked upon the rocking shaft, and a spring $n^1$ which surrounds the shaft is secured at its opposite ends to the support $n^2$ and the block $n^3$. Said spring $n^1$ acts, therefore, as a means for assisting in the operation of the arm $N^1$ in one direction. Secured to the rocking shaft $N^2$ is a downwardly-extending arm, $n$, (Figs. 13 and 22) upon the lower end of which is carried a pawl $n^4$ held by a spring, $n^5$, which is connected at its respective ends to the arm and pawl, in position to engage the teeth of a ratchet $n^7$. Said ratchet is secured upon a shaft which carries a feed-roll $n^6$, located within an ink-fountain $n^9$ depending from the cylinder-carrying frame.

The shaft which carries roll $n^6$ is also connected with a knob, $n^8$, exterior of the fountain, and enabling the feed-roll to be advanced independently of the pawl $n^4$.

In operation, the rocking of the shaft $N^2$ communicates motion to pawl $n^4$, and from thence intermittently to the feed-roll, $n^6$, which is buried in the ink contained in the fountain. The said roll carries the ink from the fountain in the form of a film or sheet, upon the surface of the roll, and in position to be removed therefrom by an ink-distributing device, which may be that hereinafter described. The last-named device will preferably be one which spreads the ink upon the distributing table or plate $n^{13}$.

For the purpose of regulating the feed of the ink from the fountain $n^9$, I provide a means for scraping excess of ink from the surface of the roll $n^6$. The illustrated device, which I have employed for this purpose, consists of an adjustable scraper-plate $n^{11}$, moved by a screw $n^{12}$ to have its forward edge moved to and from the surface of the roll, whereby the thickness of the ink-film is minutely regulated.

*Distributing and inking means.*—The illustrated printing-machine is provided with a distributing and inking mechanism which, so far as I am aware, has points of novelty in mechanisms employed for such purpose, and I do not, therefore, wish to be understood as confining my claims therefor to the combination of such mechanism with a pattern-controlled printing machine.

The distributing mechanism preferably employed by me is particularly shown in Figs. 21, 22 and 23 of the accompanying drawings. It comprises an operating lever-arm, $n^{15}$, bearing against the periphery of cam $D^4$ on the main shaft D. A coiled spring $n^{17}$ surrounds the pivoted end of the lever-arm, and one end of the spring is secured, by a screw, $n^{18}$, to the arm which is secured to a fixed part of the machine by means of a screw $n^{19}$, the unthreaded shank of which passes through the end of the lever-arm. The other end of the spring $n^{17}$ is connected by a screw $n^{21}$ to a fixed part, such as an upright $n^{22}$ of the machine. From the foregoing, it is obvious that as the cam $D^4$ is revolved, the arm $n^{15}$ is raised, by contact of the roller $n^{16}$ and periphery of the cam, and returned under the action of the spring $n^{17}$.

The distributing and inking mechanism is carried by the free end of the lever-arm $n^{15}$. Such arm, it will be noticed, is cut away or otherwise formed, as at $n^{23}$, in order to operate the inking-mechanism without contacting with the type-cylinder, $M^3$. The inking-mechanism comprises a plurality of positively connected rolls, located between the outer end of the arm $n^{15}$ and a triangular plate $n^{24}$, properly spaced away from the arm by means of short bars $n^{26}$ having threaded ends, and by nuts $n^{27}$. The rolls, $n^{28}$, $n^{29}$ $n^{30}$, are positively connected for simultaneous rotation by any suitable means, but I prefer to connect the said rolls by means of gears. For this purpose, each roll may carry a gear-wheel, $n^{31}$, and gear-wheels $n^{32}$ may be placed intermediate of the wheels $n^{31}$. When I employ a distributing and inking mechanism having positively connected rolls, these rolls, in passing over the distributing-table $n^{13}$, are all operated simultaneously and at the same speed, and the relation of the table to the cylinder $M^3$ is such that, as shown in Fig 22, the roll $n^{28}$ is still in contact with the distributing-table, while the roller $n^{39}$ is passing over the face of the selected type of the cylinder. Thus, the roll $n^{30}$, in inking the type, is not halted by contact with the cylinder, but is positively rolled over the face of the type thereby avoiding all tendency of the ink to smut or be unequally applied.

It will be noticed that the rolls $n^{28}$, $n^{29}$ and $n^{30}$ are much shorter than the type-cylinder $M^3$. This arrangement is quite desirable, especially in a machine employing a plurality of characters upon a single body. In such event, it is quite essential to ink only one character, the one selected, to the exclusion of the others. This is accomplished, in the illustrated machine, by shortening the rolls so as to ink only the particular type selected and brought to the common printing point by the cylinder-arresting stops.

*Cylinder-arresting stops.*—As hereinafter stated, the type-cylinder $M^3$ is driven, rotatively and longitudinally, to a maximum position and is returned, in both directions, by springs, and arrested, as desired, by the interposition of one or more stops. The stops and mechanisms preferred by me for operating the same are shown in the accompanying drawings, especially Figs. 1, 3, 11, 14, 15 and 16. The stops referred to are arranged in two sets, one for varying the longitudinal movement of the type-cylinder or other character-bearing body, and the other for varying the rotary movement of the said body. The first-named set are designated (see especially Figs. 11, 15 and 16) $M^{25}$, $M^{26}$, $M^{27}$, $M^{28}$, $M^{29}$, $M^{30}$, $M^{31}$, $M^{32}$ and $M^{33}$, and are arranged at the right-hand side of the machine, as shown in Figs. 1 and 11. The second-named set are designated $M^{34}$, $M^{35}$, $M^{36}$, $M^{37}$, $M^{38}$, $M^{39}$, $M^{40}$, $M^{41}$ and $M^{42}$, and are arranged at the left-hand side of the machine, Figs. 1 and 11. Each stop consists of a long flat bar or strip, passing through suitable guide-ways in the frame, and said stops are held down normally by springs $M^{51}$ (Figs. 13 and 14) connected to a fixed part of the machine and to rearward extensions $M^{50}$ of the stops.

Each series of stops, as shown, are arranged in a line. The stops $M^{25}$–$M^{33}$ are each provided with an upper extension $M^{46}$ (Fig. 14) and with a recess $M^{47}$. The extensions, when the stops are raised, are interposed in the path of longitudinal return of the cylinder, and the recesses $M^{47}$ are entered and engaged by a locking bar $M^{45}$ carried by the sliding block $M^{43}$, which latter, as hereinafter explained, moves the cylinder $M^3$ along the shaft. As shown in Fig. 14, there are two stops, one of which, that in the rear, has been thrown up to interposing position, and the other, that in front, remains down. All stops, $M^{25}$–$M^{33}$ and $M^{34}$–$M^{42}$, may be provided with shoulders $M^{48}$ to limit the upward or interposing movement. The stops $M^{34}$–$M^{42}$ are each provided at its upper end with a hook $M^{101}$ (see Fig. 13) adapted to enter or interlock with the hooked or recessed parts of the radially-arranged projections $M^{16}$–$M^{24}$, hereinafter described.

In actual operation, before the cylinder $M^3$ is moved, rotatively and longitudinally, to the maximum position, the stops, for arresting the cylinder to bring the desired character to the common printing point, are set. Such stops will include that one of the series $M^{25}$–$M^{33}$ which corresponds to the circumferential row (on the type-cylinder) containing the desired character, and also that one of the series $M^{34}$–$M^{42}$ which corresponds to the longitudinal row containing said character. Thus, for instance, if the character "J" (see Fig. 11) is to be brought to the common printing point, while the cylinder is being moved to the maximum position, and the stops $M^{27}$ and $M^{42}$ will be thrown (raised) to interposing position. As hereinbefore explained, it is not necessary to set stops for the last rows of characters on the cylinder.

It is to be noted, especially, that upon the longitudinal return, under the influence of spring $M^2$, of the cylinder, the raised stop of the series $M^{25}$–$M^{33}$ halts the sliding-block $M^{43}$, and the locking-bar $M^{45}$ carried by said sliding block enters and engages the recess $M^{47}$ of the stop-bar; also that upon the rotary return, under the influence of spring $M^{11}$, of the cylinder, the hooked end of the raised stop of the series $M^{34}$–$M^{42}$ will be engaged by the hook of the corresponding radial projection of the series $M^{16}$–$M^{24}$. The raised stops of both series will, therefore, be locked in interposed position, during the subsequent operations of the machine. I desire to especially call attention to the inclusion, in a machine of the character described, of such feature, viz., the locking of stops to control the positioning of a movable character-bearing or other body in pattern-controlled machines, and more especially printing-machines.

*Stop-operating means.*—The stops controlling the positioning of the cylinder may be operated in any desired way. Power connections will, however, be found desirable, and owing to the ease of operation and economy of installation and maintenance, I prefer to employ electro-magnetically controlled devices, included in circuits of the pattern-mechanism. By this means, the selection and operation of the stops will be directly, and in a simple manner, placed under the control of the pattern. I have shown, in Fig. 1, a simple means for accomplishing this result. It being unnecessary to illustrate the parts in detail and to show all of the magnets and armatures which are duplicates, I have shown (in Fig. 1) in dotted lines one magnet $A^{72}$ (see also Fig. 3), the armature of which lifts the stop $M^{25}$, and one magnet $a^9$, the armature of which lifts the stop $M^{42}$. As heretofore explained, the stops are restored by springs $M^{51}$. The circuit connections of the magnets $A^{72}$–$A^{80}$ and $a^1$–$a^9$ with the contacts $A^{54}$–$A^{71}$ have already been described.

It will be understood from an examination of the drawings that when the contact-frame $A^{28}$ $A^{29}$ (Fig. 5) is forced down, the circuit-closers B, C and $A^{31}$–$A^{48}$ will also be moved down, but will be insulated from the contacts B′, C′ and $A^{54}$–$A^{71}$, except at the perforations of the pattern-strip, and where these perforations occur the circuit-closers enter and contact with the corresponding pins in the bar $A^{49}$. As hereinafter explained, however, the mere act of contact of the closers and pins does not effect the energizing of electro-magnets, the circuits being completed independently of the operations of the contact-frame, and preferably at a considerable distance therefrom. By this means, hereinafter especially described, sparking upon engagement and disengagement of the contacts and pins is obviated. Otherwise the pattern-strip would be destroyed.

The pins B′ and C′, it will be seen, from an examination of Fig. 3, are not in circuit with stop-lifting magnets, but are respectively electrically connected with a "printing-interrupter magnet", $B^2$, and with a "line-trip magnet" $C^2$ and solenoid F, the uses of which devices will be explained.

*Spacing-stops and operation.*—The cylinder stops $M^{25}$–$M^{33}$ and $M^{34}$–$M^{42}$ have been hereinbefore described as operated only for character selection. It is obvious, however, that the machine must have means whereby spaces will be provided between the words of a line of printed, cast or assembled characters. In the preferred form, the pattern-strip is provided with openings representing characters, openings representing spaces between the words of the line of characters, and openings, located at the end of the line, representing (in units and tenths of units) the average amount of space to be inserted at each space in the line in order to completely justify the same. In the use of such strip, it is usually fed through a machine in a direction the reverse of its production, in order that the openings last-above named shall first of all control the setting of devices (stops, for instance) which will cause the production, between each word of the line of characters, of the amount of space represented by such devices. These devices at the occurrence of each space-opening of the line will be made operative. In my machine, the devices employed for space control are stops, and these are set by the cylinder-stops $M^{25}$–$M^{33}$ and $M^{34}$–$M^{42}$, which are at the commencement of each line—which is really the end of a printed line, since the strip is passed backwardly through the machine and the last character of the line is produced first—operated by magnets in circuit with the particular pins $A^{54}$–$A^{71}$ corresponding to the concluding openings of the line of characters. That opening which represents units will correspond to a pin of the series $A^{54}$–$A^{62}$, and that opening which represents fractions of units will correspond to a pin of the series $A^{63}$–$A^{71}$. Thus, for instance, if the strip-openings represent a space of 2.8 units necessarily to be inserted at each space of the line to completely justify the same, the closers $A^{31}$ and $A^{48}$ (Fig. 3) will pass through the openings of the strip and will contact with pins $A^{54}$ and $A^{71}$, which will by energizing the magnets $A^{72}$ and $a^9$ raise the cylinder-stops $M^{25}$ and $M^{42}$, as shown by dotted lines in Fig. 1.

The cylinder-stops $M^{25}$–$M^{33}$ and $M^{34}$–$M^{42}$, as before described, are employed for limiting the return, longitudinally and rotatively, of the type-cylinder. They also, however, raise other stops, known as spacing-stops, controlling the production of the space between words to completely justify the line. For the purpose of spacing between words, as well as for the purpose of producing, assembling or impressing the characters of a line, the machine is preferably provided with a moving carriage, or other base, which may carry the paper upon which the characters are printed or impressed. This carriage is driven by a mechanism, preferably that hereinafter described, the movements of which are limited by stops, hereinafter called "spacing-stops," and by stops hereinafter called "fatness stops." The first-named stops are lettered in the drawings $M^{105}$, $M^{106}$, $M^{107}$, $M^{108}$, $M^{109}$, $M^{110}$ and $M^{111}$, hereinafter known as unit spacing-stops, and $M^{112}$, $M^{113}$, $M^{114}$, $M^{115}$, $M^{116}$, $M^{117}$, $M^{118}$, $M^{119}$, $M^{120}$ and $M^{121}$, hereinafter known as fractions spacing-stops, the last, $M^{121}$, being a permanent stop. The cylinder-stops $M^{32}$ and $M^{33}$ are not connected with unit spacing-stops.

The preferred connections from a cylinder-stop to a unit spacing-stop or fraction spacing-stop are clearly shown, especially in Fig. 14 of the accompanying drawings. They consist of a bar or plate $M^{52}$, one end of which is secured to the side of a main stop, $M^{28}$ being shown for example, and the free end having an opening loosely fitting a pin $M^{55}$, which is secured to or integral with the lower end of a unit-spacing stop, $M^{108}$ for example. Between the bottom of said stop and the top of the plate $M^{52}$, and surrounding the pin $M^{55}$, is a coiled spring $M^{53}$, and a similarly arranged spring $M^{54}$ is located between the bottom of the plate $M^{52}$ and an enlargement on the lower end of the pin. I have thus provided flexible or yielding connections in both directions between the cylinder-stops and the units spacing-stops and the fractions spacing-stops.

The operations of the above-described connections may be briefly described as follows: Upon the raising of one or more cylinder-stops $M^{25}$–$M^{31}$ or $M^{34}$–$M^{42}$, the arm or arms $M^{52}$, connected to said cylinder-stops, will exert yielding pressure upwardly through springs $M^{53}$, upon the corresponding units spacing-stops $M^{105}$–$M^{111}$, and fractions spacing-stops $M^{112}$–$M^{119}$, thereby imparting to said spacing-stops a tendency to move. It will be obvious, also, that upon the falling of one or more of the cylinder-stops, the arm or arms $M^{52}$ will exert yielding pressure downwardly, through springs $M^{54}$, upon corresponding unit spacing-stops, thereby imparting a tendency to move the spacing-stops downwardly. As hereinafter explained, this tendency to move results in actual movement of the spacing-stops in either direction, only at the time when a line has been completed and a new line is to be commenced, and to assure this result, I provide the machine with means which lock, at the commencement of a line, the first raised spacing-stops, and prevent their return or the raising of others until the line has been completed.

The spacing-stops are provided, as shown in Fig. 14, with shoulders $M^{67}$, which are engaged, as hereinafter described, by the locking device, and whereby the stops are held in either raised or depressed position.

*Locking spacing-stops.*—The spacing-stop lock just referred to may be of any desired form. A preferred form is illustrated in the accompanying drawings, especially in Figs. 11, 14 and 17, wherein $M^{68}$ shows a reciprocating bar provided with a plurality of teeth comprising units-locking teeth $M^{180}$ (Fig. 17) and fractions-locking teeth $M^{181}$. Such bar is shown (see Fig. 11) as being operated for locking operations by a spring $M^{122}$, and oppositely operated for unlocking operations by a lever-arm, $M^{123}$, connected to armature $M^{124}$ of an electro-magnet $C^2$, known as the "line-trip magnet". Said magnet may be in circuit with the pattern-mechanism; for instance, as shown in Fig. 3, wherein the pin $C^1$ is shown as being connected by a wire $c$ with the "line-trip magnet" $C^2$ in series with the clutch-operating and braking magnet H heretofore described.

Returning now to Figs. 11 and 17, it will be seen that the bar $M^{68}$ is provided, near one end, with a recess $M^{132}$ into which the upper end $M^{125}$ of the lever-arm $M^{123}$ loosely fits, and one end of the spring $M^{122}$ is fastened to a pin carried by said arm, while its other end is secured to a fixed part of the machine. It is obvious, therefore, that whenever the magnet $C^2$ is energized, the attraction of its armature will cause a movement of the bar $M^{68}$. The magnet $C^2$ is energized only at the end of a line—which, as before explained, in reproducing the work is really the beginning of a line. To accomplish this, the pattern-strip is provided with an opening known as a "line-trip opening" which is, especially in the machine of my prior application, Serial No. 78,413, made in the pattern-strip simultaneously with the justification-openings, controlling setting of the spacing-stops, and the "line-trip opening" and the justification-openings are alined.

If, as before instanced, the justification openings represent 2.8, the closers $A^{81}$ and $A^{48}$ will pass through the justification-openings and the closer C will pass through the "line-trip opening" of the strip. The cylinder-stop magnets $A^{72}$ and $a^9$ will be placed in circuit as well as the magnet $C^2$, and upon the closing of the circuit at the distant switch, the said magnets will be energized, and there will be a simultaneous raising of cylinder-stops $M^{25}$ and $M^{42}$, and rocking of the lever-arm $M^{123}$. This will result in moving the bar $M^{68}$ to unlocking position, and in imparting a compression to springs $M^{53}$ underneath the spacing-stops $M^{105}$ and $M^{119}$. This compression will be imparted to the stops $M^{105}$ and $M^{119}$, as soon as the bar $M^{68}$ has been moved far enough to disengage the teeth $M^{130}$ and $M^{131}$ from the path of the shoulders $M^{67}$ of the spacing-stops. Thereupon, the spacing-stops set for the previous line will be drawn down by the springs $M^{54}$ connected to them, while the spacing-stops $M^{105}$ and $M^{119}$ will be raised by the compressed springs $M^{53}$ so as to have their shoulders $M^{67}$ above the path of the teeth $M^{130}$, $M^{131}$, when returning. The cylinder stops, as before explained, are locked by the cylinder, and therefore the raised spacing-stops will be held under strain until the main shaft has completed an entire revolution, and the return of the bar $M^{68}$ is assured. The raised spacing-stops will, therefore, remain so until the commencement of another line, while the cylinder-stops, which operated the same, will return, under pull of the springs $M^{51}$, to initial position. The return of said cylinder-stops will put the springs $M^{54}$, connected therewith, under strain. Thereafter during the remainder of said line, the cylinder-stops will operate without operating spacing-stops, though the springs $M^{53}$, connected to the latter, are put under strain.

The means whereby the raised spacing-stops are made effective at spaces only of the line will be hereinafter described.

*Fatness stops and operation.*—As hereinbefore stated, the type carried by the cylinder $M^3$ are arranged thereon in circumferential rows, all the characters of a row being of equal width or fatness, and there preferably being one row of two-unit characters, two rows of three-unit characters, three rows of four-unit characters, two rows of five-unit characters, and two rows of six-unit characters. The units spoken of refer to the width or "fatness" of the characters, and it is obvious that where the machine is to produce, assemble or impress a succession of characters differing in "fatness", the movement of the base or carriage, upon which the produced, assembled or impressed work is carried, must be correspondingly varied. This is especially true in the case of the illustrated machine, which is adapted to print a succession of characters of different "fatness" upon a sheet of paper held in printing position in a carriage. Obviously, said carriage must move or be moved different distances for the different "fatness" of characters, and to secure this result I provide the machine with connections, preferably operated by the cylinder-stops, whereby stops corresponding to "fatness" of characters are interposed in the path of a carriage-driving device. Thus, as an instance, whenever a four-unit character is to be printed, irrespective of the row in which the character is located, a "fatness" stop corresponding to four units will be interposed in the path of the carriage-driving device referred to.

Referring especially to Figs 14, 15 and 16, it will be seen that the machine has four "fatness stops", $M^{56}$, $M^{57}$, $M^{58}$ and $M^{59}$. The two-unit stop $M^{56}$ is raised to position by the cylinder-stop $M^{25}$, which intercepts the longitudinal return of the cylinder so as to present the two-unit-characters at the common printing point; the three-unit fatness stop $M^{57}$ is raised to position by either of the cylinder-stops $M^{26}$ $M^{27}$, which intercept successive rows of three-unit characters at the common printing point; the four-unit fatness stop $M^{58}$ is raised to position by any of the three cylinder-stops $M^{28}$, $M^{29}$, $M^{30}$, intercept successive rows of four-unit characters at the common printing-point; the five-unit fatness stop $M^{59}$ is raised by either of the two cylinder-stops $M^{31}$ $M^{32}$, which intercept successive rows of five-unit characters at the common printing-point. For the driving of the carriage to correspond to characters of six-unit fatness, a permanent-stop $M^{200}$ is provided. The absence of any movable fatness-stop will cause the carriage-driving device to move to the permanent stop corresponding to six units.

The connections whereby the cylinder-stops operate the "fatness stop" are shown in Figs. 14, 15 and 16 of the accompanying drawings. Each of the cylinder-stops $M^{25}$, $M^{26}$, $M^{27}$, $M^{28}$, $M^{29}$, $M^{30}$, $M^{31}$ and $M^{32}$ is provided with a recessed part $M^{201}$ (Fig. 14), and the said recessed parts engage with the rear edges of plates connected to the fatness stops. Thus plate $M^{60}$ is engaged by the recess of cylinder stop $M^{25}$, plate $M^{61}$ is engaged by recesses in two cylinder-stops $M^{26}$ $M^{27}$, plate $M^{62}$ is engaged by recesses in three cylinder-stops $M^{28}$ $M^{29}$ $M^{30}$, and plate $M^{63}$ is engaged by recesses in two cylinder-stops $M^{31}$ and $M^{32}$. The "fatness stops" extend upwardly from the said plates and pass through the bottom bar of the machine. Normally, such parts are held down by springs $M^{64}$, which surround the stops, and bear at their opposite ends against a plate and against a recessed part of the machine.

The stops, for arresting the return of the character-bearing body, and the means for selecting, operating, locking and restoring the stops, especially in the combinations described, may be employed, in ways obvious to persons skilled in the art, in type-casting, type-setting and similar machines, as well as linotype machines, matrix-making machines, etc.

*Carriage-driving devices.*—The machine is provided with a carriage, hereinafter especially described, and driving of said carriage is controlled by the main shaft of the machine and by the "fatness stops" and spacing-stops hereinbefore described.

The main-shaft is provided with a cam $D^3$ (Figs. 1 and 2) provided with a groove into which there fits a roller $O^{50}$ (Fig. 11) mounted on an arm $O^{51}$, the upper end of which is pivoted at $O^{52}$ in the frame of the machine, and the lower free end of which carries a pin $O^{53}$, which, as the arm $O^{51}$ is swung, plays in a slot $O^{54}$ of a bar $O^{55}$, giving reciprocatory movement to said bar. It will be obvious from the foregoing that, as the main-shaft is revolved, the pivoted arm $O^{51}$ will be oscillated upon the pivot $O^{52}$, and the bar $O^{55}$ will be reciprocated a maximum distance, and the movement of said bar, as hereinafter explained, is utilized for the purpose of returning the carriage-driving connections to normal position.

$O^1$ (see Fig. 11) indicates a link connecting a stopped sleeve (hereinafter described) with an arm $O^2$ pivoted upon the carriage-driving shaft $O^6$.

$O^3$ indicates a spring-pressed pawl carried by the arm $O^2$, and $O^4$ indicates a hold-back pawl attached to a fixed part of the machine. The pawls $O^3$ and $O^4$ engage the teeth of a wheel $O^5$ secured upon a rearwardly-extending shaft $O^6$ which communicates motion to carriage-driving gears as hereinafter described. A second wheel $O^8$, designated the "accumulator-wheel", is also secured upon the shaft $O^6$. Fitted around the journal through which the shaft passes, is a coiled spring $O^9$, having one end secured to the machine-frame, and the other end secured to the rocking-arm, $O^2$, so as to exert thereon a constant tendency to move to the left (see Fig. 11). At the rear of the machine the shaft $O^6$ carries a pinion $O^7$. This pinion engages with a geared wheel $O^{11}$ (see Figs. 18, 19, 20) to which is attached a smaller gear-wheel $O^{12}$, in turn meshing with the teeth of a rack-bar $O^{14}$, secured to the carriage of the machine. Said carriage is provided with a carriage-frame $O^{15}$, which is fitted in the machine-frame, and slides on ball-bearings $O^{16}$ $O^{17}$, or otherwise. The carriage-frame is provided with uprights or supports $O^{18}$, for the carriage hereinafter described.

The carriage is operated against tension exerted by a strip $O^{19}$ wound around a barrel $O^{20}$, which contains a coiled spring $O^{21}$, one end of which is connected to the drum, and the other end of which is connected to an axial pin $O^{22}$. One end of the strip $O^{19}$ is connected to a pin $O^{23}$ on the carriage.

My improved machine may be provided with connections whereby I may produce, assemble or impress different fonts of type, and in order to accomplish this result I provide the machine with connections which increase or decrease, as desired, the amount of travel of the carriage irrespective of the limitations imposed, as hereinafter described, by the "fatness stops" and spacing-stops. In order to accomplish this result, it is necessary that the unit of movement of the carriage may be increased or diminished as desired. For this purpose, I mount the wheel $O^{11}$ (Figs. 18, 19, 20) upon a stud $O^{24}$, projecting inwardly from a plate $O^{25}$. The plate $O^{25}$ is locked in place by means of a bolt $O^{26}$, the threaded part of which passes through a slot $O^{27}$ in plate $O^{25}$ and engages a recess in the machine-base. It will be obvious that, upon the substitution of a larger or smaller wheel $O^{11}$, the ratio of movement from the pinion $O^7$ to the rack $O^{14}$ will be correspondingly increased or diminished; it will further be obvious that the adjustment due to substitution of wheels will be taken up by unscrewing bolt $O^{26}$, sliding the plate $O^{25}$ as desired, and again locking by tightening the bolt.

To take up the shock due to the carriage return, as hereinafter described, I provide a buffer arrangement (see Figs. 18 and 19), comprising a cylinder $O^{27}$ closed at one end and secured to the machine-frame, and a plunger $O^{28}$ at the end of a rod $O^{29}$ carried by an extension $O^{30}$ of the carriage-frame. Upon the complete restoration of the carriage, by mechanisms hereinafter described, the plunger enters said cylinder, and the shock of the return of the carriage is prevented, by reason of the air resistance.

*Controlling carriage driving.*—The driving of the carriage is controlled by the "fatness stops" and by the spacing-stops heretofore described. As explained, the "fatness stops" $M^{56}$–$M^{59}$ are operated whenever a character is to be produced, assembled or impressed, and the spacing-stops $M^{105}$–$M^{111}$ and $M^{112}$–$M^{119}$ are set at the commencement of a line and made effective at each space between the words of said line. It is, therefore, necessary to provide means whereby the driving-device, whatever its form, shall be limited by either set of stops as required. Thus when characters are to be produced, assembled or impressed, the driving-device must be limited by the "fatness stops"; and at the production or insertion of spaces the driving-device must be limited by the spacing-stops. It is to be remembered that units and fractions spacing-stops may be set.

As hereinafter described, the fractions spacing-stops are employed only for the purpose of driving an accumulating-device wherein the fractions are accumulated until equaling complete units and then transferred to the carriage-driving mechanism. The carriage-driving device will, therefore, be described as being controlled only by the units spacing-stops and by the "fatness stops." The electro-magnetic connections whereby the cylinder-stops are moved, to set the spacing-stops and to operate the fatness-stops, have heretofore been described.

The illustrated mechanism for driving the carriage is as follows: The link $O^1$ is connected to a collar $M^{73}$ fitting a sleeve $M^{70}$ which is slidably mounted, by a groove and rib, upon a rock-shaft $M^{69}$, journaled in the machine-frame. Said sleeve $M^{70}$ is reciprocated upon said rock-bar by movement of the arm $O^2$ under pull of spring $O^9$ (Fig. 20) and is restored to position by the rod $O^{55}$, a projection $O^{33}$ of the latter engaging the end of the sleeve to accomplish such result. The sleeve $M^{70}$ is provided with two permanent stops or abutments, $M^{71}$ $M^{72}$ (Fig. 14) which are spaced apart a greater distance than that between the row of "fatness-stops" and the row of units spacing-stops, so that during reciprocation of the sleeve at spaces, the permanent stop $M^{72}$ will be opposed by a set units spacing-stop, while the permanent stop $M^{71}$ will be unopposed, and at the production, assembling or impressing of characters, the permanent stop $M^{71}$ will be opposed by raised "fatness stops," while the stop $M^{72}$ will be unopposed. The rock-shaft $M^{69}$ has a normal position, shown in Fig. 14, in which the permanent stop $M^{71}$, when the sleeve is reciprocated, will be opposed by "fatness stops," and a spring $O^{77}$, exerting a pull on an arm $O^{75}$ at the left hand side of the machine-frame maintains the rock-shaft in the normal position. In order to rock the shaft, to bring $M^{72}$ into opposed position, a rod $O^{76}$ is given an upward thrust. To move said arm, I provide a lever $O^{78}$ (Fig. 12) carrying an armature $O^{79}$ moved by an electro-magnet $B^3$. This magnet (see Fig. 3) is connected with a pin $B'$ of the pattern-mechanism, and in a circuit which includes wire $b^2$, contacts $b^3$, wire $b^4$, magnet $B^3$, wire $b^5$, contacts $b^6$, and wires $b^7$ and $b^8$ to generator Z. These connections will be put in circuit upon the occurrence of a space representation in the pattern-strip, at which time circuit-closer B will pass through the opening of the strip and contact with a pin $B'$.

It will be obvious from the foregoing, that at the production, assembling or impression of characters, the "fatness stops" will limit the movement of sleeve $M^{70}$ by opposing stop $M^{71}$, while at the production of space, the units spacing-stops will limit the sleeve's movement by opposing stop $M^{72}$. The movement of the sleeve will be controlled by spring $O^9$, acting on arm $O^2$, and such arm will move until the sleeve is stopped, carrying the pawl $O^3$ over the periphery of wheel $O^5$ a number of teeth corresponding to the position of the "fatness stop" or units spacing-stop. Thus, "fatness-stop" $M^{57}$ will permit the arm to move three spaces, and spacing-stop $M^{106}$ will permit the arm to move three spaces.

*Fractions accumulator and operation.*— As hereinbefore explained, a pattern-controlled machine, made in accordance with my invention, has for one of its objects to produce a line of characters justified by the insertion of complete units of space between words. It has been stated that, in order to accomplish this, the units represented by the spacing-stops are inserted and the fractions are accumulated until equaling unity, whereupon such unit will be transferred to the carriage-driving mechanism. The preferred mechanism for accomplishing this purpose is illustrated in Figs. 11, 13, 15 and 16 of the accompanying drawings. A spur or finger $R^1$, carried by the reciprocatory rod $O^{55}$, is adapted to engage with a rib $R^2$, integral with a rock-bar $R^3$. Said bar is also provided with a second rib $R^3$. Upon rocking-shaft $M^{69}$, hereinbefore referred to, is slidably fitted a fractions-sleeve $R^4$, and from one side of said sleeve projects a permanent stop $R^5$ and from the opposite side projects a similar stop $R^7$. The first-named stop is adapted to be opposed by or ride over a yielding stop $R^6$, which is spring-seated at $R^8$ in the frame of the machine, as hereinafter described. The position of the stops $R^5$ and $R^7$ is such that when the stop $R^7$ is brought into the path of the fractions stops $M^{112-121}$, which occurs when a space is to be produced, by rocking the shaft $M^{69}$, then the stop $R^5$ will be out of line with the stop $R^6$, and when the stop $R^5$ is in position to be opposed by the stop $R^6$, which will occur at the production, assembling or impressing of the characters, the stop $R^7$ will be out of the path of the fractions-stops $M^{112-121}$.

The rack bar $R^8$ engages the teeth of a wheel $R^9$ (see Fig. 13) which is integral with the shaft $R^{10}$ on which is loosely fitted a notched wheel $R^{16}$ and a cam body $R^{17}$ carrying a cam $R^{25}$ (Fig. 11). To the side of the wheel $R^{16}$ is secured a pin $R^{14}$ and one end of a spring $R^{15}$, coiled around the shaft $R^{10}$, is secured to said pin while the other end of the spring is connected to the pin $R^{13}$ carried by a drum $R^{11}$. A flat strip $R^{12}$ (see especially Fig. 13) bears against the periphery of said drum. The cam wheel $R^{17}$, referred to, is provided with ten edge notches which are engaged by a latch $R^{18}$ yieldingly held in place by a spring $R^{19}$ which is fitted in a collar $R^{20}$, which is fastened to shaft $R^{10}$. A coiled spring $R^{30}$, connected to the axle $R^{10}$ is employed to operate the accumulator connections. It will thus be seen that the wheel $R^{16}$ is operated, at each space, a number of notches corresponding to the number of fractions represented by the set fractions spacing-stop. This operation, until the connections are restored, will continue in one direction, and when the cam-tooth $R^{25}$ on said wheel (see Fig. 11) is brought to proper position, the accumulated unit thus accumulated will be transferred to the carriage-driving connections. For this purpose, the cam $R^{25}$ will strike against the end of an arm $R^{26}$, adapted to have a sliding movement by means of a slot $R^{27}$ on a screw $R^{28}$, a spring $R^{29}$ restoring said arm after the cam has passed. A tooth $R^{301}$ on said arm engages the teeth of wheel $O^8$ imparts movement thereto and to the axle $O^6$. This movement will occur during the upward movement of the arm $O^2$, and the accumulated unit will thus be transferred to the carriage during a space, and while the main carriage-driving connections are being moved to operative position by spring $O^9$.

Fractions-accumulator devices of the kind shown and described by me will, it is obvious, be useful in connection with machines other than the printing machine particularly described and shown—such as typecasting, type-setting or matrix-making machines, or linotype machines.

*Rocking frame of carriage.*—The carriage $O^{15}$ has a rocking part which, at the proper time, brings the paper carried thereby to position to be impressed against the inked-type of the cylinder $M^3$.

Referring to Figs. 13, 19 and 20, it will be seen that the periphery of cam $D^6$ of the main shaft bears against one branch $D^{10}$ of the upper end of an arm $D^{11}$ pivoted at $D^{12}$ to a fixed part of the machine. A second branch of the upper end of the arm is forked at $D^{13}$, and the forked part engages a bar $D^{14}$, of arms $D^{17}$. The arm $D^{11}$, when thrown by the cam $D^6$, will be returned by the spring $D^{15}$. $D^{18}$ $D^{18}$ indicate arms for holding a guide-roll $D^{19}$ in place. The paper $D^{20}$ passes over a fixed guide-plate $D^{29}$ and passes thence upwardly between rolls $D^{16}$ $D^{19}$, and thence between plates $D^{21}$ $D^{22}$ into position to be impressed against the inked-type of the cylinder. As shown in Figs. 18 and 20 the plate 21 is provided with a long opening $D^{23}$, to permit the hammer (hereinafter described) to pass, and to force the paper to the type.

*Impression-taking device.*—In order to imprint the inked character on the paper, I provide a device whereby the paper, after the carriage frame has been rocked, will be forced against the inked type. For this purpose, a swinging-arm provided with a hammer head is employed. I prefer to use an electro-magnet to control the operation of said arm. The means employed by me have a further point of novelty that the pressure exerted by or the power contributed to said arm is varied to accord with the fatness of the character to be impressed. For broad characters, a comparatively heavy stroke or pressure is given by said arm; for periods or other thin characters a correspondingly light stroke or pressure is given. In addition, I have provided a buffing or dampening device hereinafter described, which permits the paper to be forced against the types with the pressure desired, and according to the surface-area of the character to be impressed. As heretofore explained, the characters may be at different heights from the surface of the cylinder, according to the surface-area of the character.

In order to secure the strength of stroke or blow of the impression-taking arm, I have included in my machine an automatically-operating means whereby the amount of resistance in the circuit of the arm-operating magnet will be varied according to the fatness of the character to be impressed. Referring to Figs. 2 and 3, it will be seen that the lever M, which longitudinally drives the cylinder $M^3$, is provided with a switch $T^1$, the free end of which is adapted to be swept into engagement with plates $T^3$, $T^4$, $T^5$, $T^6$, $T^7$ and $T^8$, supported by and insulated from an arm $T^2$ of the machine. The several plates, it will be seen by reference to Fig. 3, are connected to wires $T^9$, $T^{10}$, $T^{11}$, $T^{12}$, $T^{13}$ and $T^{14}$, of different resistance, and all of these are connected by wire $T^{15}$, circuit-closers $T^{16}$ $T^{17}$, wire $T^{18}$, arm-operating magnet $B^5$ (before referred to) and wire $T^{19}$ to the generator Z. Thus as the switch $T^1$ is thrown to a plate, the selection whereof is governed by the arrest of the returning cylinder, the corresponding amount of resistance will be thrown in circuit.

As shown in Fig. 2, the magnet $B^5$, when energized, attracts an armature $T^{20}$ and swings the impression-taking arm $T^{21}$ toward the paper.

It is necessary, as before explained, for securing clear and even impressions, that the paper shall be forced against the selected type with a pressure which varies according to the surface area of the selected type. Thus, for instance, a period while having the same unit-width as the letter "i" is much sharper or has less surface-area than the letter. It will be readily understood that if the same pressure was imparted to the paper when taking impressions of both characters, the period would be forced through the paper. I have hereinbefore pointed out that this fault may, in a measure, be corrected by having the types of different heights irrespective of their unit-widths. The result sought may be further accomplished by the employment of buffing or dampening devices, such as those shown in Figs. 25 and 26. The forward end of the arm $T^{21}$, before described, is provided with a hammer-head $T^{22}$, and a type-hammer $T^{23}$ is secured thereon by screws or the like. I prefer to make the type-hammer $T^{23}$ of pressed fiber or celluloid, or other material which, while strong, will not break the type of the cylinder. The hammer-head is adapted upon its forward stroke to rest upon the bar $T^{26}$ of the machine. An elastic or yielding block, such as a piece of rubber $T^{25}$, may be fitted in a holder $T^{24}$, as shown in Fig. 25. The holder $T^{24}$ may be integral with the end of the arm.

In operation, when the end of the arm is thrown forward by the magnet, the hammer $T^{23}$ enters the opening $D^{23}$ of the carriage and forces the paper against the selected type. If the type selected is a high type (i. e., one at a maximum distance from the surface of the cylinder) the hammer will force the paper against the type and the buffer, $T^{25}$, will not be effective, but if the selected type is a low one, the continued movement of the arm will force the buffer against the bar $T^{26}$, in accordance with the height of the character. The impression-taking devices will not, however, be operated at the production of a space. As shown in Fig. 3, a magnet $B^2$, the armature $B^4$ of which controls the engagement or separation of contacts $T^{16}$, $T^{17}$, is in circuit, by wire $b'$, with the pin $B'$ of the pattern-mechanism, and whenever the space opening occurs in the pattern-strip, the magnet $B^2$ will be energized, and the circuit through the impression-taking magnet $B^5$ will be broken by separation of contacts $T^{16}$ and $T^{17}$.

*Carriage-restoring means.*—When a line is completed, it is necessary to restore the carriage to initial position, and I have therefore provided the machine with automatically-operating devices whereby the result is effected. Such means also operate a means for shifting the paper for imprinting a new line.

The pattern-strip has a line-trip opening therein. This opening is punched in the strip at the end of a line and its position is such that, as shown in Fig. 3, the circuit-closer C passes through such opening and contacts with pin $C^1$, and places in circuit the brake $H^2$, temporarily stopping the machine, and the magnet $C^2$ operating the lever $M^{123}$ (Fig. 11) for setting the units and fractions spacing-stops, and also places in circuit a solenoid F and an electro-magnet G. The last-named magnet (see Fig. 1) is provided with an armature $G^1$, one arm of which $G^2$, rocks a plate $S^{10}$ pivoted upon the axle $O^6$ of the carriage driving devices (see Fig. 11). The plate $S^{10}$ carries the pin $R^{31}$ and is provided with cam-surfaces which bear against projections $S^2$ $S^3$ upon the pawls $O^3$ $O^4$. As a result of the rocking of such plate, the pawls $O^3$ and $O^4$ and the tooth $R^{30}$ of arm $R^{20}$ are disengaged from the wheels $O^5$ $O^8$, and the carriage (Fig. 18) is drawn back to initial position by the spring $O^{21}$, exerting pull on the drum $O^{20}$ and band $O^{19}$. To complete the return of the carriage, a bar $F^3$ (Fig. 18), constituting a magnet-core and carried by the carriage, will enter the solenoid near the conclusion of the return of the carriage, and the pull exerted by the solenoid will complete the return of the carriage as far as predetermined. The machine is further provided with means whereby the return of the carriage shifts the paper for printing a new line. The form shown comprises a cam-part carried by the frame, and a movable part on the carriage whereby the feed-roll is operated.

The machine-frame as shown has an upright plate $F^4$ (Figs. 18, 19) provided with an overhanging beveled part $F^5$. The carriage is provided with a projecting pin $F^6$ fixed to an arm $F^7$ pivoted at $F^8$ coincidently with the axis of the feed-roll. The arm $F^7$ carries spring-pressed pawls $F^9$ $F^{10}$ which engage the teeth of a wheel $F^{11}$ secured to the feed-roll. A spring $F^{12}$ returns the arm $F^7$ against a stop, shown by me adjustable, and comprising a threaded shank $F^{13}$ operated by a thumb-screw $F^{14}$ and locked by a nut $F^{15}$. Pawls $F^{16}$ are provided for the purpose of holding the feed-cylinder to advanced position.

It will be obvious that upon the return of the carriage, the projection $F^6$ passes under the inclined plate $F^5$, and the feed-roll $D^{24}$ is moved the adjusted distance, presenting a new printing surface.

The solenoid F will be of considerable assistance in completing the return of the carriage and the operation of the "new line" device. The complete return of the carriage will also break the contacts $C^3$ and $C^4$, thus again demagnetizing the line trip magnet and also the brake, whereupon the clutch $H^1$ will again resume engagement with the driving disk $H^2$, and the operation of printing the new line will commence.

*Restoring accumulator.*—The carriage having been restored, it is of course necessary to restore the parts of the accumulator mechanism, in order that all parts shall be returned to zero.

Referring to Figs. 11 and 16, it will be seen that the bar $M^{68}$, when retracted by the arm $M^{125}$ of the magnet-lever $M^{123}$, will exert a pull on a rod $S^3$, and that this rod will withdraw a bolt $S^4$, which is normally seated by a spring $S^5$, into engagement with the teeth of wheel $R^{16}$, as said wheel is revolved, and it will further be seen that when the plate $S^{10}$ is rocked, it will throw an arm $R^{23}$ backward, said arm being guided by a slot fitting a screw $R^{24}$. The arm $R^{23}$ is provided with a cam $R^{21}$, and this cam presses a pin $R^{22}$, and thus throws the latch $R^{19}$ out of engagement with edge-teeth $R^{23}$ of the cam-wheel $R^{17}$. By the connections above described, the cam-wheel $R^{17}$ is unlocked, and restored by spring $R^{15}$.

*Safety-devices on carriage.*—The carriage is provided with two safety-devices, one which requires that the carriage shall be completely restored before the printing shall be commenced, and a second device which automatically disconnects the machine, until thrown out of engagement by the attendant, from the driving connections, if by reason of absence of a "line-trip" perforation in the pattern or otherwise, the carriage is operated a greater distance than that predetermined. The last-named safety-device is shown especially in Figs. 3 and 18 of the accompanying drawings. K indicates a lever-arm pivoted upon the upper end of an upright $K^1$ by means of a screw $K^2$. At its lower end it carries an insulated contact $K^3$ normally held into engagement with a second contact $K^4$ secured to and insulated from the upright $K^1$. The arm K is held in circuit-closing position by a spring $K^5$ connected to said arm and to an arm $K^6$, an offset $K^8$ of which is constantly pressed downwardly upon the upper edge of the rack-bar $O^{30}$ by a long spring $K^7$, the opposite ends of which are connected to said arm $K^6$ and to the upright.

It will be seen that if the carriage is moved a greater distance than that predetermined, so as to have the offset $K^8$ out of engagement with the upper edge of the rack-bar $O^{30}$, the spring $K^7$ will pull the arm $K^6$, and will cause a pin on said arm to engage with the arm K and separate the contact $K^3$ from $K^4$. A reference to Fig. 3 will show that, in such event, the circuit through magnet J will be broken, the contacts $J^{98}$ and $J^{99}$ will be brought together, and a circuit will be completed through the clutch-holder magnet $H^8$ and brake-magnet H.

*Operations of the machine.*—The operations of the hereinbefore-described mechanisms are as follows: (1) The pattern is fed to present a new row of perforations; (2) the circuit-closing frame descends, and contacts carried thereby pass through corresponding perforations in the pattern; (3) the rotary switch closes the circuits selected as aforesaid; (4) the corresponding electromagnets are energized and cylinder-stops are lifted, together with the proper fatness-stop; (5) the cylinder is brought against the selected cylinder-stop of the series, $M^{25}$–$M^{33}$; (6) the carriage-driving device $O^5$ is moved to the fatness-stop raised as aforesaid; (7) the printing-magnet is energized, and the impression-taking arm is operated.

In the printing of a line, the last character will be printed first when, as in the employment of the pattern shown, the pattern is passed through the machine in a direction the reverse of the production of the pattern.

Suppose the mechanism to be required to print the sentence, "When, in the course of human events," which would be part of a paragraph indicated on a perforated strip represented by Fig. 24, the line of perforations shown at $Z^1$ would be presented to the contact frame first, and the following contacts would be made: space-trip, line-trip, and the combination representing three units and four-tenths of justification; these contacts are respectively (see Fig. 3) B $B^1$, C $C^1$, $A^{32}$, $A^{55}$, $A^{44}$, $A^{67}$. A short time after these contacts have been made, their circuits are completed by the rotary switch $L^1$ $L^3$. The line-trip circuit operates the brake and combined clutch H, which stops the machine. Simultaneously the pawls release magnet G is operated by a branch of the same circuit, and releases the retaining pawls holding the carriage, thus allowing the carriage to return. The same magnet operates one of the retaining-pawls to restore the fractions accumulator device, hitherto described, to zero. The space-trip circuit at this time only operates through one of its branches, viz., the printing interrupter; the other branch, called the "space-rotating magnet circuit", is cut out by the opening of the contacts mounted on armature of magnet G (see Fig. 3); thus, while the printing is interrupted at this time, the space-rotating shaft $M^{69}$ is not rotated, as at some other times, when the space-trip hole is presented. The other contacts, $A^{32}$, $A^{55}$ and $A^{44}$ $A^{67}$, close circuits which operate magnets $A^{73}$ and $a^5$, which in turn throw up stops $M^{106}$, $M^{116}$ (see Fig. 11). When the release magnet G was operated as aforesaid, it also released one of the pawls of the fractions-accumulator device; the line-trip magnet $C^2$ being on the same circuit with release magnet G, and parallel with it, it operates simultaneously and through connections heretofore described, releases the other pawl $S^4$ (see Fig. 16) of the accumulator device, thus allowing its restoration to zero; it also pulls out the locking-bar $M^{68}$ (see Fig. 17), which allows the justification pins previously used to drop, and enables the new pins, in this case $M^{106}$ and $M^{116}$, to be raised into position for locking. Another motion obtained from this magnet at this time is the raising of the intercepting pin $O^{83}$, which serves during the completion of the revolution, after the carriage returns, to limit the movement of the carriage to one unit. Thus the back-lash is taken out of the carriage-driving gearing and insures the carriage a permanent starting position irrespective of back-lash of gearing.

All of the above-named circuits remain closed until broken by the switch, $L^1$ $L^3$, except the line-trip circuit, which is broken by the carriage return, as hereinbefore described. The solenoid F, which is in series with pawls, release magnet G, is energized, and when the carriage returns sufficiently by the action of its spring to bring the core $F^3$ into the field of the solenoid, which draws the limiting-pin $C^5$ of the carriage up against the stop $C^6$, and also by bearing against the end of the lever $C^7$ breaks the line-trip and brake circuit; the machine will start up again automatically by the brake and clutch release, the line-trip magnet being deënergized, allows the justification-lock $M^{68}$ to return and thus lock up in place the pins $M^{106}$ and $M^{116}$; the intercepting-pin $O^{83}$ does not fall, as it is held frictionally and restored by the return of the bar $O^{55}$, which carries a latch $O^{80}$ provided with an inclined surface. The machine completes its revolution, but does not print, as the interrupter has been energized, the carriage has been restored to zero, and moved forward one unit to take out back-lash, the justification-pins have been thrown up for use at every space between words and locked in place; the fractions-accumulator has been restored to zero, and the next revolution of the machine will print the comma after " s " in " events," after which every revolution will record a character or a space.

The first character to be printed will be the comma. The pin $A^{31}$ will contact with $A^{54}$ through one of the holes in the strip, and the pin $A^{41}$ will contact with the pin $A^{64}$ through the other hole of the strip. Current will, therefore, upon the closing of the rotary switch $L^3$, pass through the magnets $A^{72}$ and $a^2$. Magnet $a^2$ will throw up stop $M^{35}$, and magnet $A^{72}$ will throw up stop $M^{25}$ and also the two-unit fatness stop $M^{56}$. The cams will now permit the cylinder, under the action of the springs $M^2$ and $M^{11}$, to take its place against the stops, and the locking pin $m$ will now enter the opening presented and bring the character into exact alinement on the opposite side. Simultaneous with this movement, the inking-arm $n^{23}$ carrying the inking-rollers will descend and roller $n^{30}$ will ink the type. As the inking-rollers ascend, the rock-frame $D^{21}$ will carry the paper up to the type, and the rotary switch, now having closed the printing circuit, the printing-arm $T^{21}$, actuated by magnet $B^5$, will make the impression. The comma being a two-unit character, the arm $T^1$ has assumed its position over contact $T^7$, and the high resistance $T^{13}$ being cut in, the impression will be correspondingly light. During this time, the bar $O^{55}$ has traveled to the left, having been actuated by cam $D^3$, permitting spring $O^9$ to draw the sleeve $M^{70}$ to the left (Fig. 11) until the stop-pin $M^{56}$, previously raised, prevents its further movement. The link $O^1$, arm $O^2$ and pawl $O^3$ move two units, by reason of their connection with cylinder $M^{70}$. The impression now having been taken, the rock-frame recedes from the type, the pin M is withdrawn, the cylinder returned by its cams, and the bar $O^{55}$ returns to the right (Fig. 11), carrying with it cylinder $M^{70}$ and wheel $O^5$, transmits its motion, through the gears $O^7$, $O^{11}$, $O^{12}$, and the rack $O^{14}$, to the carriage which moves forward two units (the width of a comma), leaving a fresh space upon which to imprint the next character. While the carriage is moving, the circuit is broken by the rotary-switch $L^3$. The cam $A^{24}$ now permits the pin frame $A^{28}$, $A^{29}$ to rise, and the toothed cylinder $A^{11}$ to move forward one hole under action of the spring $A^{25}$, as hereinbefore described. The frame $A^{28}$, $A^{29}$ will again descend and make the contacts necessary to control the operations of printing the next character, in this case the letter " s." In this manner, all the characters of the word " events " are produced. The space-trip hole will next come into position under the contact-frame. The frame will be depressed, making contact B $B^1$. Upon the final contact being made by the rotary switch $L^3$, the current will pass through wire $b^1$ to the printing-interrupter magnet, and break the printing-circuit as hereinbefore described. The magnet $B^3$ will also be energized, rotating the shaft $M^{69}$, and thus bringing the pin $M^{72}$ on cylinder $M^{70}$ in the path of the units-spacing stops, and also bringing pin $R^7$, of cylinder $R^4$, into position to be opposed by the fractions spacing stops as hereinbefore described.

Under action of the cam $D^3$, through reciprocating-bar $O^{55}$, the cylinder is permitted to be drawn by spring $O^9$ until the pin $M^{72}$ is arrested by three units-spacing stop $M^{106}$ which was raised at the beginning of the line. The bar $O^{55}$ also permits the spring $R^{30}$ to rotate the shaft $R^{10}$ and gear $R^9$ which moves the rack $R^8$ to the left (Fig. 11) until its attached cylinder $R^4$ is arrested by the four-tenths spacing-stop $M^{116}$. Plunger-pawl $R^{19}$ carries with it the counting wheel $R^{16}$ four tenths of a revolution, which winds up spring $R^{15}$. The bar $O^{55}$, on its return movement, carries the pawl $R^{17}$ back to its initial position, leaving the counting wheel $R^{16}$ with four-tenths registered on it. The bar $O^{55}$ also picks up and carries back the cylinder $M^{70}$ and its connections with pawl $O^3$, thus moving the carriage three units. The circuit through magnet $B^3$ is then broken by rotary-switch $L^3$ and the shaft $M^{69}$ is rotated back to character-spacing position. During this operation, the type-cylinder moves to its extreme position and is centered by pin M. The rock-frame of the carriage moves the paper up to the type, but no character is printed because the printing-circuit was broken at the beginning of the cycle. I prefer to allow these idle movements of sleeve and paper rather than complicate the machine by putting in mechanism for stopping them. The pattern-strip is now moved to the next character, and the operations for printing the word "human" will be similar to those of "events." The next space will be made in a like manner as the first, but will add four-tenths more to those already accumulated, making eight-tenths. After printing the word "of", the machine will again make a space, and the forward movement of the bar $O^{55}$ will permit the counting wheel to record four tenths more, thus making twelve-tenths, or one unit and two-tenths. The completed unit is added as the cam-surface $R^{25}$ (Fig. 11) passes under the cam $R^{26}$, and transmits its motion through the arm and the wheel $O^8$ and by the shaft $O^6$ to the carriage. The return movement of the bar $O^{55}$ will count three units more, making in all four units for this space. The word "course" will next be impressed, after which there will be another space, during which the accumulator will add four-tenths more to the two left from the last space. After printing the word "the", another space must be made, during which operation the accumulated tenths will again become a unit and a four unit space will be made. The word "in" and its adjoining space will be made in a similar manner, leaving four-tenths recorded on the accumulator. When the word "when" has been impressed, the operations of returning the carriage, presenting a new line of paper and restoring the tenths accumulator to zero, will be performed as before described. The four-tenths recorded during the last space will be discarded.

In cases where the last line of a paragraph is not as long as the other line forming the paragraph, as for instance the paragraph shown below:

"The economic law that the prices of commodities are determined by the volume of money, cannot be repealed or reversed by any statute or any Congress".

and since the controller is put through this machine the reverse way from which it was made, and the carriage always starts from the same place, it is obvious that before the period after the character "s" in "Congress" is printed, the carriage must move an amount equal to the space from the right end of line to the period before that character can be impressed. Therefore, the controller has been provided with representations of a number of six-unit spaces, consisting of a series of space-trip holes in combination with a series of six-unit character openings (see application No. 78,413, filed October 12, 1901, Fig. 39). This combination throws up a six-unit stop, and while it operates the printing interrupter, as heretofore described, it does not operate to rotate the rock-shaft $M^{69}$; therefore the carriage is moved forward six units for every combination thus presented on the controller; and while the character-bearing body is positioned, no printing takes place; therefore the carriage moves forward the required distance in six-unit amounts. It will be seen by referring to Fig. 3, that the circuit combination for line fill is formed by contacts $B$, $B^1$ and $A^{39}$, $A^{62}$; the former of these circuits operates the printing interrupter, and would operate the space-rotating magnet $B^3$, were it not that its circuit is broken by the movement of the armature of magnet $A^{80}$, which magnet has been energized by closing a circuit at $A^{39}$ and $A^{62}$. As hereinbefore described, the circuit of space rotation magnet is normally not open at $B^3$, but is opened by the movement of the armature of magnet $A^{80}$.

The illustrated and described clutch and connections, which are particularly advantageous in a machine for producing justified lines, constitute the subject-matter of an application, Serial No. 134,474, filed December 9, 1902, as a division of my present case.

While I have herein described and shown combinations of parts which I have found to be highly advantageous in printing, and which also carry out the preferred method of accumulation of fractions of units at spaces, I do not desire to be understood as confining myself to such combinations. Obviously, many other embodiments, readily suggesting themselves to skilled persons, will be included within the claims of my patent.

I claim:

1. In a machine of the character described, a main shaft, a driving shaft, a clutch for connecting said shafts, an electro-magnet for operating said clutch, a traveling carriage for the machine, and circuit closers separated by the carriage, for automatically rendering the magnet effective for disconnecting the clutch substantially as described.

2. In a machine of the character described, a main shaft, a driving shaft, a clutch for connecting said shafts, an electro-magnet for operating said clutch, a traveling carriage for the machine, and means operated by the carriage for automatically rendering the magnet effective for disconnecting the clutch, substantially as described.

3. In a machine of the character described, a main shaft, a driving shaft, a clutch for connecting said shafts, a traveling carriage for the machine, means for automatically disconnecting the clutch and means for maintaining it disconnected unless or until the carriage has been completely returned, substantially as described.

4. In a machine of the character described, a main shaft, a driving shaft, a clutch for connecting the shafts, an electro-magnet for operating said clutch, a traveling carriage for the machine, means independently of the carriage for rendering the magnet effective for disconnecting the clutch, and means for maintaining the magnet so effective unless or until the carriage has been completely returned, substantially as described.

5. In a machine of the character described, a main shaft, a driving shaft, a clutch for connecting said shafts, an electro-magnet for operating said clutch, a traveling carriage for the machine, a circuit-closer operated independently of the carriage for closing a circuit through the magnet, and circuit-breaking means controlled by the carriage and separated thereby when completely returned, substantially as described.

6. In a machine of the character described, a main shaft, a driving shaft, a clutch for connecting said shafts, an electro-magnet for operating said clutch, a traveling carriage for the machine, a contact connected with said magnet, a circuit-closer operating independently of the carriage and separable from said contact by a pattern, and circuit-breaking means controlled by the carriage and separated thereby when completely returned, substantially as described.

7. In a machine of the character described, a main shaft, a driving shaft, a clutch for connecting said shafts, an electro-magnet for operating said clutch, a traveling carriage for the machine, a circuit-closer operated independently of the carriage for closing a circuit through the magnet, and circuit-breaking means including a lever, operated by the carriage when completely returned, and breaking the circuit of the electro-magnet, substantially as described.

8. In a machine of the character described, a main shaft, a driving shaft, a clutch for connecting said shafts, an electro-magnet for operating said clutch, a traveling carriage for the machine, an adjustable trip on the carriage, and circuit breaking means including a lever, operated by the adjustable trip aforesaid, when the carriage is completely returned, and breaking the circuit of the electro-magnet, substantially as described.

9. In a pattern-controlled printing-machine, a pattern-feeding mechanism, a type-bearing cylinder mounted for reciprocation upon a rotatable shaft, means for rotating the shaft, means for reciprocating the cylinder thereon, means for returning both the cylinder and the shaft, means controlled by the pattern for arresting the shaft, and means, also controlled by the pattern, for arresting the cylinder, substantially as described.

10. In a pattern-controlled printing-machine, a type-bearing cylinder mounted upon a rotatable shaft, means for rotating the shaft and means for returning the same, a plurality of stops radially disposed upon the said shaft, and means for arresting the shaft as desired by engaging the selected stop, substantially as described.

11. In a pattern-controlled printing-machine, a type-bearing cylinder, mounted upon a rotatable shaft, means for rotating the shaft and means for returning the same, a plurality of projections radially disposed upon the said shaft, said projections having hooked ends, and means for arresting the shaft as desired by engaging and interlocking with the selected projections, substantially as described.

12. In a machine of the character described, a pattern-feeding mechanism, character-selecting means, settable stops controlled by the pattern for arresting said means, and means for locking the set stop or stops, substantially as described.

13. In a machine of the character described, a pattern feeding mechanism, character-selecting means, settable stops controlled by the pattern for arresting said means, and means under control of the character-selecting means for locking the set stop or stops substantially as described.

14. In a pattern-controlled printing-machine, a type-bearing cylinder, mounted upon a shaft and arranged thereon for reciprocation, means for reciprocating the cylinder, a block reciprocating therewith, stops set for arresting the block at a desired position, and means whereby the stops when set are interlocked with the reciprocating block, substantially as described.

15. In a pattern-controlled printing-machine, a type-bearing cylinder mounted upon a shaft and an attached block arranged for reciprocation, a roller upon said block, a lever for engaging said roller and reciprocating the block and a cam carried by the main shaft of the machine for operating the lever, substantially as described.

16. In a pattern-controlled printing-machine, a printing-mechanism, connections under control of the pattern for selecting desired characters, means for taking impressions from the selected characters, and means operated by the character-selecting means for varying the power of the impression-taking means, substantially as described.

17. In a pattern-controlled printing-machine, a printing-mechanism, connections under control of the pattern for selecting desired characters, means for taking impressions from the selected characters, and means operated by the character-selecting means for varying the amount of pressure communicated to the impression-taking means, substantially as described.

18. In a pattern-controlled printing-machine, a printing-mechanism, connections under control of the pattern for selecting desired characters, an arm for taking impressions from the selected characters, an electro-magnet for giving impression-taking strokes to said arm, and a switch operated by the character-selecting means for varying the amount of resistance in the circuit of the electro-magnet, substantially as described.

19. In a pattern-controlled printing-machine, a type-bearing cylinder and means for moving the cylinder to a desired position, in combination with means for taking impressions from the type of the cylinder, an electro-magnet for operating said means, and a switch operated by the cylinder-moving means for varying the amount of resistance in the circuit of the electro-magnet, substantially as described.

20. In a pattern-controlled printing-machine, a type-bearing cylinder and means for moving the cylinder to a desired position, in combination with an arm for taking impressions from the type of the cylinder, an electro-magnet for giving impression-taking strokes to said arm, and a switch operated by the cylinder-moving means for varying the amount of resistance in the circuit of the electro-magnet, substantially as described.

21. In a pattern-controlled printing-machine, a type-bearing cylinder, means for moving the same to a desired position, and means operated by a pattern to control the movements of the cylinder, in combination with means for taking impressions from the type of the cylinder, an electro-magnet for operating said means, and with means for cutting the magnet out of circuit at certain portions of the pattern, substantially as described.

22. In a pattern-controlled printing-machine, a printing mechanism, connections for selecting desired characters, means for taking impressions from the selected characters, and means for automatically varying the power of the impression-taking means, substantially as described.

23. In a pattern-controlled printing-machine, a printing-mechanism, connections for selecting desired characters, means for taking impressions from the selected characters, an electro-magnet controlling the operation of the impression-taking means and means for automatically varying the influence of the electro-magnet, substantially as described.

24. In a pattern-controlled printing-machine, a printing-mechanism, connections for selecting desired characters, means for taking impressions from the selected characters, an electro-magnet controlling the operation of the impression-taking means and means for automatically varying the resistance of the circuit of said magnet, substantially as described.

25. In a machine of the character described, a character-bearing or other body arranged to have movements in two directions, stops to limit the movements of the body, electro-magnets controlling said stops, pattern-feeding and circuit-closing devices operated by the pattern for selecting the desired limiting-stops, in combination with a traveling carriage for the machine, means for operating said carriage and means for variably regulating the travel of the carriage, substantially as described.

26. In a machine of the character described, a character-bearing or other body arranged to have movements in two directions, stops to limit the movements of the body, electro-magnets controlling said stops, pattern-feeding and circuit-closing devices operated by the pattern for selecting the desired limiting-stops, in combination with a traveling carriage for the machine, means for moving said carriage, and two sets of stops under control of the aforesaid body-limiting stops, the stops of the first named set operating simultaneously with the body-limiting stops in both directions, and the stops of the second named set being moved to position by the body-limiting stops and there locked independently of the last named stop, substantially as described.

27. In a machine of the character described, a character-bearing or other body arranged to have movements in two directions, stops to limit the movements of the body, pattern-feeding devices and connections operated by the pattern for selecting the desired limiting stops, in combination with a traveling carriage for the machine, means for operating said carriage, and stops movable to position by those first named, for variably regulating the travel of the carriage, substantially as described.

28. In a machine of the character described, a character-bearing or other body arranged to have movements in two directions, stops to limit the movements of the body, pattern-feeding devices and connections operated by the pattern for selecting the desired limiting stops, in combination with a traveling carriage for the machine, means for operating said carriage, and stops, less in number than those first named and each movable to position by two or more of the first-named stops, for variably regulating the travel of the carriage, substantially as described.

29. In a machine of the character described, a character-bearing or other body arranged to have movements in two directions, a traveling carriage for the machine and means for operating said carriage, in combination with stops for limiting movements of the character-printing or other body, with stops for variably regulating the travel of the carriage, and means for simultaneously moving one member of each set of stops to position, substantially as described.

30. In a machine of the character described, a character-bearing or other body, means for moving the same, stops for controlling its movements, and locking connections from the body-operating connections to the stops operated as aforesaid, substantially as described.

31. In a machine of the character described, a character-bearing or other body, stops for limiting the movements thereof and connections for operating said stops, said stops consisting of upright reciprocatory rods connected by springs to the frame of the machine, substantially as described.

32. In a machine of the character described, a character-bearing or other body, a traveling carriage, stops for limiting the movements of the body, stops for limiting the travel of the carriage, connections whereby the first-named stops operate those last-named, and means for operating the first-named stops, substantially as described.

33. In a machine of the character described, a character-bearing or other body, a traveling carriage, stops for limiting the movements of the body, stops for limiting the travel of the carriage, yielding connections between the two sets of stops whereby those first-named impart a tendency to move to those last named, and means for operating the first-named stops, substantially as described.

34. In a machine of the character described, a traveling carriage, means for driving the same, stops representing units for limiting the movements of the carriage, stops representing fractional parts of units, means controlled by the last-named stops for accumulating the fractions of units in a suitable device, and connections from the accumulating device for independently driving the carriage, substantially as described.

35. In a machine of the character described, a traveling-carriage, means for driving the same, stops representing units for limiting the movements of the driving means, stops representing fractional parts of units, means controlled by the last-named stops for accumulating the fractions of units in a suitable device, and connections from the accumulating device for independently driving the carriage, substantially as described.

36. In a machine of the character described, a traveling carriage, means for driving the same, a mechanism representing units for controlling the movements of the carriage, a mechanism for accumulating fractional parts of units, and connections from the accumulating-device for independently driving the carriage, substantially as described.

37. In a machine of the character described, a traveling carriage, a pattern-mechanism, two sets of stops controlled by the pattern-mechanism for limiting the movements of the carriage, and means controlled by the pattern-mechanism for rendering either of the sets of stops effective, substantially as described.

38. In a machine of the character described, a traveling carriage, a pattern-mechanism, two sets of stops controlled by the pattern-mechanism for limiting the movements of the carriage, and connections including electrical conductors from the pattern-mechanism, an electro-magnet, an armature therefor and means operated by the armature, for rendering either of the sets of stops effective, substantially as described.

39. In a machine of the character described, a traveling-carriage, a pattern-mechanism, two sets of stops controlled by the pattern-mechanism for limiting the movements of the carriage, a carriage-driving mechanism adapted to be moved to different positions for arrest by either of the sets of stops aforesaid, and means controlled by the pattern-mechanism for moving the carriage-driving mechanism to either of the positions mentioned, substantially as described.

40. In a machine of the character described, a traveling carriage, a pattern-mechanism, two sets of stops controlled by the pattern-mechanism for limiting the movements of the carriage, a carriage-driving mechanism adapted to be moved to different positions for arrest by either of the sets of stops aforesaid, and connections, including electrical conductors, from the pattern-mechanism, an electro-magnet, an armature therefor and means operated by the armature for moving the carriage-driving mechanism to either of the positions mentioned, substantially as described.

41. In a machine of the character described, a traveling carriage, a pattern-mechanism, two sets of stops controlled by the pattern-mechanism for limiting the movements of the carriage, a carriage-driving mechanism, including a driving-rod adapted to be rocked and pawl and ratchet device, and means controlled by the pattern-mechanism for rocking the rod to position for arrest by either of the sets of stops aforesaid, substantially as described.

42. In a machine of the character described, a traveling-carriage, a pattern-mechanism, two sets of stops controlled by the pattern-mechanism for limiting the movements of the carriage, a carriage-driving mechanism including a driving-rod adapted to be rocked and connected pawl and ratchet devices, and connections, including electrical conductors from the pattern-mechanism, an electro-magnet, and armature therefor, and means operated by the armature for rocking the rod to position to be arrested by either of the sets of stops aforesaid, substantially as described.

43. In a machine of the character described, a traveling carriage, a pattern-mechanism, two sets of stops controlled by the pattern-mechanism for limiting the movements of the carriage, a carriage-driving mechanism, including a reciprocatory driving-rod adapted to be independently rocked, a pawl connected with the driving-rod by a collar, a ratchet driven by the pawl and connected with the carriage, and means controlled by the pattern-mechanism for rocking the rod to position to be arrested by either of the sets of stops aforesaid, substantially as described.

44. In a machine of the character described, a traveling carriage, stops controlled by the pattern-mechanism, for limiting the movements of the carriage, a carriage-driving mechanism having a part adapted to be moved to different positions for arrest of the driving-mechanism, and means controlled by the pattern-mechanism for moving said part of the driving-mechanism to either of the positions mentioned, substantially as described.

45. In a machine of the character described, a traveling carriage, means for driving the same, including a stud, and means permitting movement of the stud and substitution of toothed-wheels on the stud, substantially as described.

46. In a machine of the character described, a traveling carriage, means for driving the same, including a gear upon a fixed axis, a rack on the carriage, an intermediate gear and means permitting movement of the axis of the intermediate gear and substitution of gears thereon, substantially as described.

47. In a machine of the character described, a traveling carriage, means for driving the same, including a gear upon a fixed axis, a rack on the carriage, a pawl and ratchet for driving said gear, a rack on the carriage, an intermediate gear, a movable stud for the intermediate gear, and a device for locking the stud in position, substantially as described.

48. In a machine of the character described, a traveling carriage and means for returning the carriage to initial position, said means including a spring and electro-magnet for completing the return of the carriage, substantially as described.

49. In a machine of the character described, a traveling-carriage and means for returning the carriage to initial position, said means including a spring and a solenoid magnet, the coil of which is fixed upon the machine, and the core of which is carried by the carriage, substantially as described.

50. In a machine of the carriage described, a traveling carriage, means for returning the carriage and an electro-magnet energized for completing the returning movement, substantially as described.

51. In a machine of the character described, a traveling-carriage, means for releasing the same, an electro-magnet for operating the releasing means, and means for returning the released carriage to initial position, substantially as described.

52. In a machine of the character described, a pattern-mechanism, a traveling-carriage, an electro-magnet for operating the releasing means, and electrical connections from the pattern-mechanism to said electro-magnet, substantially as described.

53. In a machine of the character described, a traveling-carriage, means for releasing the same, an electro-magnet for operating said means, a separate electro-magnet for assisting the return of the released carriage, and means for simultaneously energizing both electro-magnets, substantially as described.

54. In a pattern-controlled printing-machine, a character-printing body movable to position as desired, a pattern mechanism for controlling the positioning of the body, and inking mechanism, including a roll, operating independently of the pattern mechanism, said roll moved independently of the character movements, substantially as described.

55. In a pattern-controlled printing-machine, a character-printing body movable to position as desired, a pattern-mechanism for controlling the positioning of the body, inking mechanism, including a roll, operating independently of the pattern-mechanism, said roll moved independently of the character movements, and means for taking impressions from the inked characters of the body, substantially as described.

56. In a pattern-controlled printing-machine, a character-printing body, a main shaft for moving the body to position as desired, a pattern-mechanism for controlling the position of the body, and inking-mechanism comprising a movable arm carrying rollers, and operated by the main shaft, substantially as described.

57. In a pattern-controlled printing-machine, a character-printing body, means for moving the same to position as desired, and an inking-mechanism comprising a plurality of rolls positively connected for simultaneous rotation, substantially as described.

58. In a pattern-controlled printing-machine, a character-printing body, means for moving the same to position as desired, inking-mechanism comprising a lever carrying a plurality of rolls positively connected for simultaneous rotation, and means for operating the lever, substantially as described.

59. In a pattern-controlled printing-machine, a pattern-mechanism, a printing-mechanism, an impression-taking mechanism, a main shaft for operating the printing-mechanism as desired, electro-magnetically controlled means for controlling the operation of the printing-mechanism, electro-magnetically controlled means for controlling the operation of the impression taking means, and a rotary switch operated by the main shaft for energizing both sets of electro-magnetically controlled means successively and in the order stated, substantially as described.

60. In a pattern-controlled printing-machine, a type-bearing cylinder, means for positioning the cylinder as desired, locking means for the positioned cylinder, inking-mechanism comprising ink-feeding and ink-distributing means and connections controlled by the locking means aforesaid for operating the ink-feeding means, substantially as described.

61. In a pattern-controlled printing-machine, a type-bearing cylinder, means for positioning the cylinder as desired, inking-mechanism, a paper-carrying traveling-carriage, means for moving the paper toward the cylinder, and an impression-taking device operating independently of the last-mentioned means, substantially as described.

62. In a pattern-controlled printing-machine, a pattern feeding mechanism, a type-bearing cylinder, means controlled by the pattern for positioning the cylinder as desired, inking mechanism, a paper-carrying traveling-carriage, including a rocking frame, and means for rocking said frame to move the paper to and from the positioned cylinder, substantially as described.

63. In a pattern-controlled printing-machine, a pattern feeding mechanism, a type-bearing cylinder, means controlled by the pattern for positioning the cylinder as desired, inking mechanism, a paper-carrying traveling-carriage, including a rocking frame, a lever for rocking said frame, and a main shaft and connections for operating the lever, substantially as described.

64. In a pattern-controlled printing-machine, a pattern feeding mechanism, a pattern-mechanism, a paper-carrying traveling-carriage, "new line" means for moving the paper to present a new line for printing and means controlled by the pattern-mechanism for putting the "new line" means in operation, substantially as described.

65. In a pattern-controlled printing-machine, a pattern-mechanism, printing inking and impression-taking mechanisms, a paper-carrying traveling-carriage, "new line" means for moving the paper to present a new line for printing, and means controlled by the pattern-mechanism for returning the carriage to initial position, and for putting the "new line" means in operation, substantially as described.

66. In a pattern-controlled printing-machine, a pattern-mechanism, a paper-carrying traveling-carriage, "new line" means for moving the paper to present a new line for printing, means for adjusting the extent of movement of the "new line" means, and means controlled by the pattern-mechanism for putting the "new line" means in operation, substantially as described.

67. In a pattern-controlled printing-machine, a pattern-mechanism, a paper-carrying traveling-carriage, "new line" means for moving the paper to present a new line for printing, means controlled by the pattern-mechanism for putting the "new line" means in operation, and an electro-magnet energized for assuring the completion of such operation, substantially as described.

68. In a pattern-controlled printing-machine, a type-bearing cylinder, a paper-carrying carriage, impression taking means and means for varying the power of the impression-taking means according to the units-width of the character to be printed, substantially as described.

69. In a pattern-controlled printing-machine, a type-bearing cylinder, a paper-carrying carriage, impression-taking means, controlled by an electro-magnet, and means for varying the electrical resistance in circuit with said magnet in accordance with the units-width of the character to be printed, substantially as described.

70. In a pattern-controlled printing-machine, a type-bearing cylinder, a paper-carrying carriage, impression-taking means, means for varying the power of the impression-taking means according to the units-width of the character to be printed, and means for opposing a yielding resistance to the operation of the impression-taking means according to the surface-area of the character printed, substantially as described.

71. In a pattern-controlled printing-machine, a type-bearing cylinder, a paper-carrying carriage, impression-taking means, and means for opposing a yielding resistance to the operation of the impression-taking means according to the surface-area of the character to be printed, substantially as described.

72. In a pattern-controlled printing-machine, a type-bearing cylinder whereon the characters are arranged at different heights in accordance with the surface-area of the characters, a paper-carrying carriage, impression-taking means, and means for opposing a yielding resistance to the operation of the impression-taking means according to the surface-area of the character to be printed, substantially as described.

73. In a pattern-controlled printing-machine, a type-bearing cylinder whereon the characters are arranged in rows corresponding to the units-width of the characters and are at different heights in accordance with the surface-area of the characters, a paper-carrying carriage, impression-taking means, means for varying the power of the impression-taking means according to the units-width of the character to be printed, and means for opposing a yielding resistance to the operation of the impression-taking means according to the surface-area of the character to be printed, substantially as described.

74. In a machine of the character described, a traveling carriage, carriage-driving mechanism, a pattern-mechanism, means controlled by the pattern-mechanism for directly controlling the movements of the carriage-driving mechanism, an accumulating-device, means similarly controlled for contributing movements to the accumulating-device and means for transmitting movements from the accumulating-device to the carriage-driving mechanism, substantially as described.

75. In a machine of the character described, a traveling carriage, carriage-driving mechanism, a pattern-mechanism, means controlled by the pattern-mechanism for directly controlling the movements of the carriage-driving mechanism, an accumulating-device, means similarly controlled for contributing movements to the accumulating-device, means for transmitting movements from the accumulating-device to the carriage-driving mechanism, and means for restoring the accumulating-device to initial position, substantially as described.

76. In a machine of the character described, a traveling-carriage, carriage-driving mechanism, a pattern-mechanism, means for directly controlling the movements of the carriage driving mechanism, an accumulating-device, means for contributing movements thereto, means for transmitting movements from the accumulating-device to the carriage-driving mechanism, and means controlled by the pattern-mechanism for restoring the accumulating-device to initial position, substantially as described.

77. In a machine of the character described, a traveling-carriage, carriage-driving mechanism, a pattern-mechanism, means for directly controlling the movements of the carriage-driving mechanism, an accumulating-device, including movable parts, springs for restoring the same, latches for said parts, means for contributing movements to the said parts, means for transmitting movements from the said accumulating-device to the carriage-driving mechanism, and means for operating the latches for the release of the restoring springs, substantially as described.

78. In a machine of the character described, a traveling carriage, carriage-driving mechanism, carriage-restoring means, means for directly controlling the movements of the carriage-driving mechanism, an accumulating-device, means for contributing movements thereto, means for restoring the same, means for transmitting movements from the accumulating-device to the carriage-driving mechanism, and a unitary device for releasing the carriage-driving mechanism and accumulating-device, substantially as described.

79. In a machine of the character described, a pattern-mechanism, a traveling-carriage, carriage-driving mechanism, carriage-restoring means, means for directly controlling the movements of the carriage-driving mechanism, an accumulating-device, means for contributing movements thereto, means for restoring the same, means for transmitting movements from the accumulating-device to the carriage-driving mechanism, a unitary device for releasing the carriage-driving mechanism and accumulating-device, and means controlled by the pattern-mechanism for operating the unitary device, substantially as described.

80. In a machine of the character described, a traveling-carriage, carriage driving mechanism, means for directly controlling the movements of the driving mechanism, an accumulating-device, means for contributing movements thereto, means for transmitting movements from the accumulating-device to the carriage-driving mechanism, means for restoring the accumulating-devices to initial position, and an electro-magnet and connections for operating the last-named means, substantially as described.

81. In a pattern-controlled printing-machine, the combination, with a pattern-mechanism and with a main shaft and connections, of a character-printing body driven by the shaft and connections and regulated by means under the control of the pattern-mechanism, a paper-carrying traveling-carriage driven by the shaft and connections and regulated by means under control of the pattern-mechanism, type-inking and impression-taking means operated by the shaft and connections, and carriage-restoring devices under control of the pattern-mechanism, substantially as described.

82. In a pattern-controlled printing-machine, the combination, with a pattern-mechanism and with a main shaft and connections, of a character-printing body driven by the shaft and connections and regulated by means under control of the pattern-mechanism, a paper-carrying traveling carriage driven by the shaft and connections and regulated by means under control of the pattern-mechanism, type-inking and impression-taking means operated by the shaft and connections, and means under control of the pattern-mechanism for stopping the machine, at the end of a line, substantially as described.

83. In a pattern-controlled printing machine, the combination, with a pattern-mechanism, comprising electrical contacts and wires leading therefrom, and with a main shaft carrying a clutch, and a plurality of cams, of means whereby the shaft drives the pattern-mechanism, a character-printing body driven by one or more cams and connections and stops regulated by magnets in the circuits of the pattern-mechanism contacts, a paper-carrying traveling-carriage driven by one or more cams and connections and stops regulated by magnets in the circuits of the pattern-mechanism contacts, inking-mechanism operated by one or more cams, impression-taking means operated by an electro-magnet, an electro-magnet controlling the clutch and included in a circuit of the pattern mechanism contacts, and rotary switch connections driven by the shaft for alternately closing the circuits through the pattern-mechanism and through the impression-taking means, substantially as described.

84. In a pattern-controlled printing-machine, a pattern-feeding mechanism, and printing, inking and impression-taking mechanisms, in combination with means, controlled by the pattern, for automatically stopping the machine at the conclusion of a printed line, and means for automatically moving the paper for the printing of a new line, substantially as described.

85. In a pattern-controlled printing-machine, a pattern-feeding mechanism, printing, inking and impression-taking mechanisms, and a paper-carrying traveling-carriage, in combination with means, controlled by the pattern, for restoring the carriage to initial position, substantially as described.

86. In a machine of the character described, a movable carriage, "fatness stops" interposed or removed for the purpose of variably controlling the movements of the carriage, according to the units-width of the character selected, and connections for locking an interposed or removed "fatness stop" during the subsequent operations of the machine, substantially as described.

87. In a machine of the character described, a movable character-bearing body, stops for controlling the positioning of such body, a movable carriage, "fatness stops" interposed or removed for the purpose of variably controlling the movements of the carriage according to the units-width of the character selected, and connections whereby one or more of the first named stops and an interposed or removed "fatness stop" are locked during the subsequent operations of the machine, substantially as described.

88. In a machine of the character described, a movable character-bearing body, stops for controlling the positioning of such body, a movable carriage, "fatness stops" interposed or removed for the purpose of variably controlling movements of the carriage according to the units-width of the character selected, connections whereby the first named stops operated the "fatness stop" as desired, and means for locking the first named stops in the position to which they have moved when operating the "fatness stops," substantially as described.

89. In a pattern-controlled printing-machine, a movable type-bearing cylinder, stops for controlling the positioning of such cylinder, a movable paper-carrying carriage, "fatness stops" interposed or removed for the purpose of variably controlling the movements of the carriage according to the units-width of the character selected, connections whereby the cylinder-controlling stops operate the "fatness stops" as desired, and means for locking an operated cylinder-controlling stop, substantially as described.

90. In a pattern-controlled printing-machine, a movable type-bearing cylinder, stops arranged in groups for controlling the positioning of such cylinder, a movable paper-carrying carriage, "fatness stops", less in number than the cylinder controlling stops and interposed or removed for the purpose of variably controlling the movements of the carriage according to the units-width of the character selected, connections whereby a member of a group of cylinder-controlling stops will operate the corresponding "fatness stop", and means for locking an operated cylinder-controlling stop, substantially as described.

91. In a pattern-controlled printing-machine, a pattern-feeding mechanism, a type-bearing cylinder, means controlled by the pattern for moving the cylinder to present the desired characters at a printing point, means for exclusively inking the character particularly selected, and means comprising a movable arm carrying rollers, and for taking an impression from the inked character, substantially as described.

92. In a pattern-controlled printing-machine, a pattern-feeding mechanism, a type-bearing cylinder, means controlled by the pattern for moving the cylinder to present the desired characters at a printing point, means for exclusively inking the character particularly selected, means comprising a movable arm carrying rollers, and for taking an impression from the inked character, and means, controlled by the pattern, for moving the paper after each impression, substantially as described.

93. In a pattern-controlled printing-machine, a pattern-feeding mechanism, a type-bearing cylinder having characters of different unit-widths, means for exclusively inking the character particularly selected, means for taking an impression from the inked character, and means, controlled by the pattern, for moving the paper a number of units corresponding to the width of the selected character, substantially as described.

94. In a pattern-controlled printing-machine, a pattern-feeding mechanism, a type-bearing cylinder, means for moving the cylinder, stops controlled by the pattern for arresting the cylinder as desired, a paper-carrying traveling-carriage, means controlled by the pattern for moving the carriage a number of units in accordance with the unit-widths of the character selected, inking means for exclusively inking the character selected, means for taking an impression therefrom upon the paper of the carriage and means for varying the power of the impression-taking means according to the surface area of the character to be printed, substantially as described.

95. In a machine of the character described, a pattern-feeding mechanism, means controlled by the pattern for disengaging the machine from driving connections, and an automatically-operating lock for holding the machine in disengaged position, substantially as described.

96. In a machine for producing justified lines, means for regulating the amount of interword and other line spaces, comprising a fractions-accumulating device, and means operated by the fractions-accumulating device when the fractions equal unity, in combination with a pattern-feeding mechanism and connections therefrom controlling the movements of the fractions-accumulating device, substantially as described.

97. In a machine for producing justified lines, means for regulating the amount of interword and other line spaces, comprising a fractions-accumulating device, and means operated by the fractions-accumulating device when the fractions equal unity, in combination with means to receive a composing strip or ribbon, and connections with said means for controlling the movements of the fractions-accumulating device, substantially as described.

98. In a machine for producing justified lines, means for regulating the amount of interword and other line spaces, comprising a fractional device, and means operated thereby when the device has moved an amount equaling unity, substantially as described.

In witness whereof, I have hereunto signed my name this 7th day of March, 1902.

WALTER S. TIMMIS.

In presence of—
JAMES J. COSGROVE,
WM. H. BERRIGAN, Jr.

Copies of this patent may be obtained for five cents each, by addressing the "Commissioner of Patents, Washington, D. C."